(12) United States Patent
Spinella

(10) Patent No.: US 9,906,068 B2
(45) Date of Patent: Feb. 27, 2018

(54) METHOD AND APPARATUS FOR TRANSFERRING ELECTRICAL POWER BY CAPACITIVE COUPLING FROM A CHARGING DEVICE TO A USER DEVICE

(71) Applicant: EGGTRONIC S.R.L., Modena (IT)

(72) Inventor: Igor Spinella, Modena (IT)

(73) Assignee: EGGTRONIC ENGINEERING S.R.L., Modena (IT)

( * ) Notice: Subject to any disclaimer, the term of this patent is extended or adjusted under 35 U.S.C. 154(b) by 0 days.

(21) Appl. No.: 15/307,290

(22) PCT Filed: Jun. 17, 2015

(86) PCT No.: PCT/IB2015/001020
§ 371 (c)(1),
(2) Date: Oct. 27, 2016

(87) PCT Pub. No.: WO2015/198123
PCT Pub. Date: Dec. 30, 2015

(65) Prior Publication Data
US 2017/0063144 A1     Mar. 2, 2017

(30) Foreign Application Priority Data

Jun. 26, 2014   (IT) .............................. RE2014A0055

(51) Int. Cl.
*H02J 7/00*     (2006.01)
*H02J 7/02*     (2016.01)
(Continued)

(52) U.S. Cl.
CPC .............. *H02J 7/025* (2013.01); *H02J 50/05* (2016.02); *H02J 50/12* (2016.02)

(58) Field of Classification Search
CPC ...................................................... H02J 7/025
(Continued)

(56) References Cited

U.S. PATENT DOCUMENTS

| 2010/0264653 | A1* | 10/2010 | Bu ............................ H02P 9/00 |
| | | | 290/16 |
| 2012/0246374 | A1 | 9/2012 | Fino |
| 2014/0008990 | A1* | 1/2014 | Yoon ........................ H02J 5/005 |
| | | | 307/104 |

FOREIGN PATENT DOCUMENTS

| WO | 2013150352 A1 | 10/2013 |
| WO | WO 2013150352 A1 * | 10/2013 ............ H02M 3/005 |

* cited by examiner

*Primary Examiner* — Yalkew Fantu
(74) *Attorney, Agent, or Firm* — Volpe and Koenig, P.C.

(57) ABSTRACT

An apparatus is provided for transferring power to an electrical load, including: a charging device including an assembly of at least three transmitting armatures, and a primary electrical circuit connecting each transmitting armature to a tension generator; a user device including the electrical load, at least a pair of receiving armatures, and a secondary electrical circuit connecting the receiving armatures to the electrical load, the pair of receiving armatures being faceable to at least a pair of transmitting armatures of the charging device realizing therewith at least two distinct electrical capacitors; an electronic system for monitoring and selecting, connected to the primary circuit of the charging device, which is configured to identify a first sub-assembly of transmitting armatures which face an armature of the receiving armatures of the user device, and to identify a second sub-assembly of transmitting armatures which face the other receiving armature of the user device.

16 Claims, 10 Drawing Sheets

(51) Int. Cl.
*H02J 50/05* (2016.01)
*H02J 50/12* (2016.01)

(58) Field of Classification Search
USPC .......................................................... 320/108
See application file for complete search history.

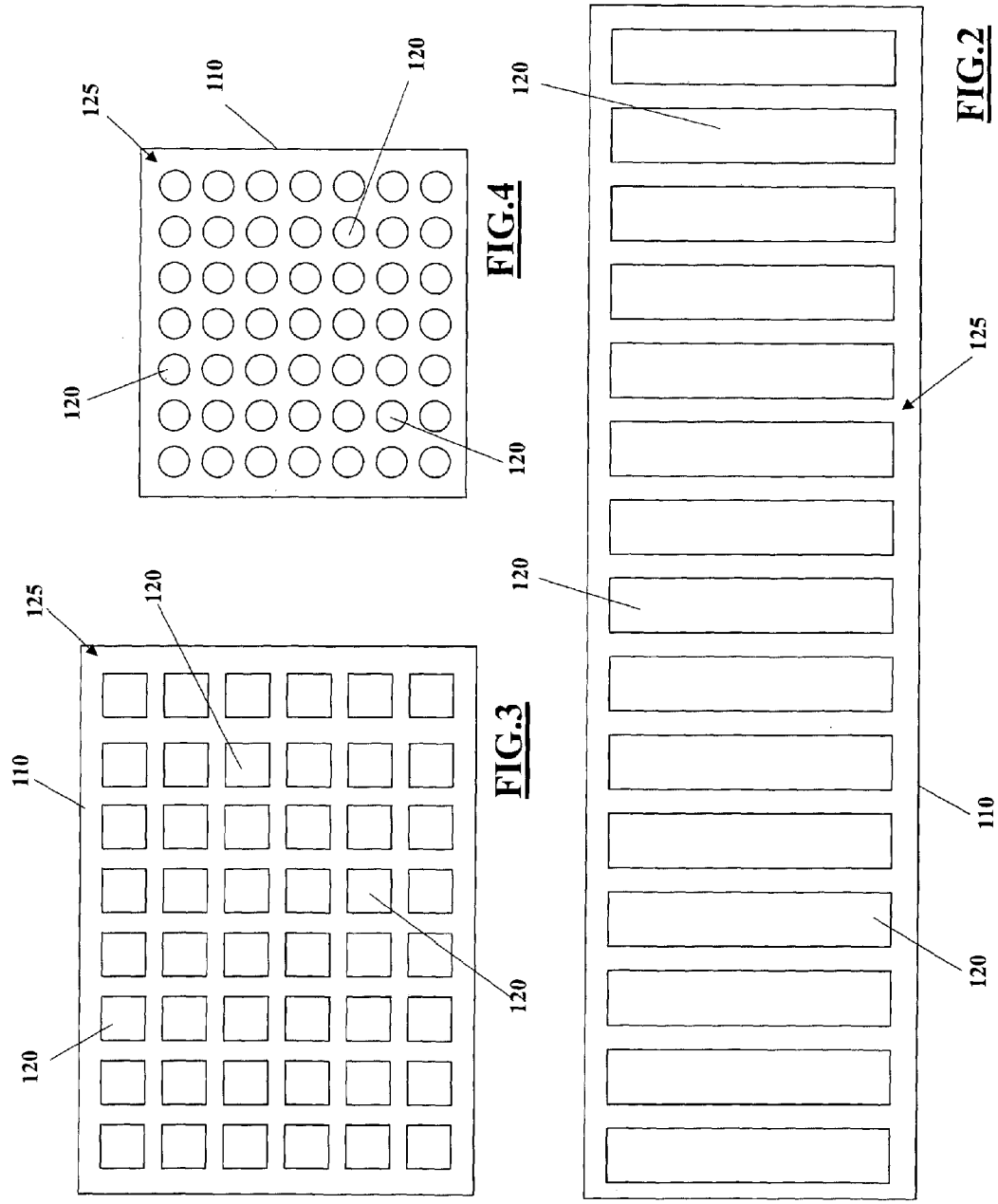

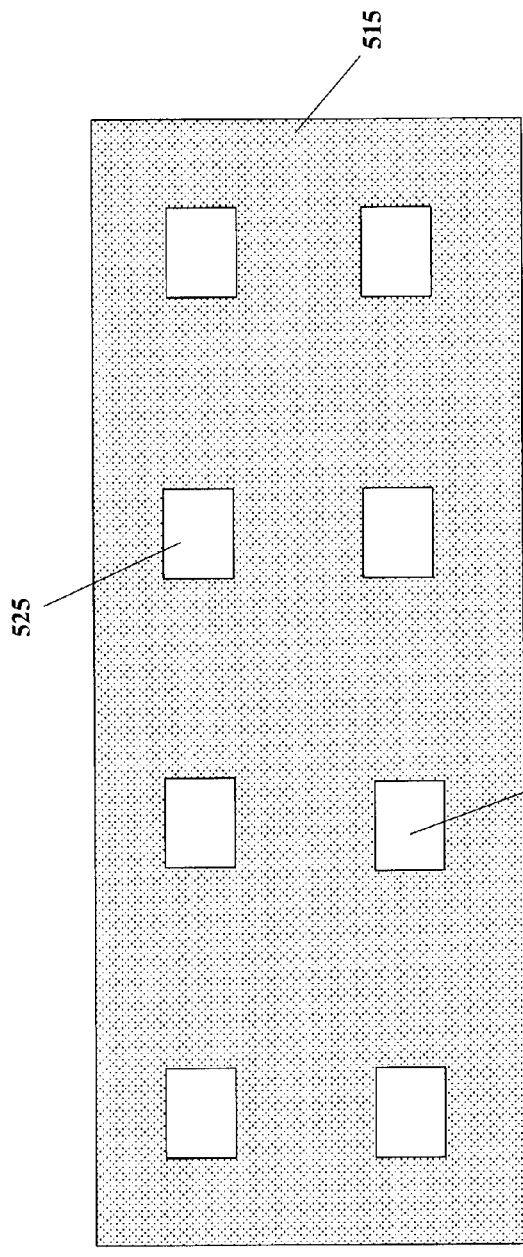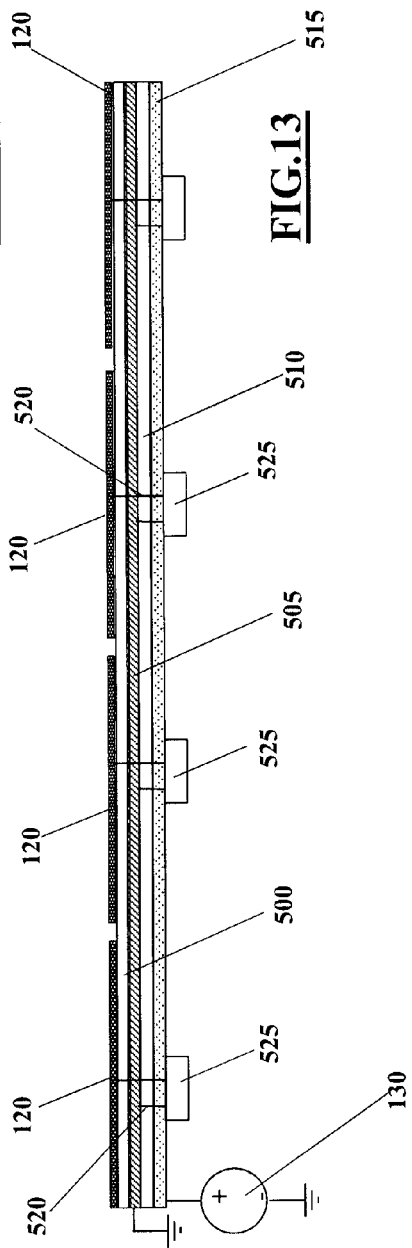

METHOD AND APPARATUS FOR TRANSFERRING ELECTRICAL POWER BY CAPACITIVE COUPLING FROM A CHARGING DEVICE TO A USER DEVICE

TECHNICAL FIELD

The present invention relates in general to a method and an apparatus for transferring electrical power to one or more electrical loads. The electrical load or loads can be, for example, any electrical or electronic device which is to be electrically supplied so as to enable functioning thereof and/or for charging the internal batteries of the device itself. Classic examples of this type of electrical/electronic device are mobile telephones, tablets, televisions, lighting systems for example LEDs and the like.

PRIOR ART

A solution at present very often applied for transferring electrical power to a load is to use an AC/DC converter able to convert an alternating current (AC) generated for example by a common electrical distribution network into a direct current (DC) able to supply the charge. The load to be charged can be connected to the AC/DC converter directly, for example via usual connection wires. For greater practicality, the connection between the load to be charged and the AC/DC converter can be realised by means of a mechanical system of electrical contacts having an appropriate form, for example such as conductive plates connected to the converter and able to be placed in contact with corresponding electrical contacts connected to the load. This system of contacts is realised with an appropriate geometry, in order to guarantee at all times the galvanic connection of the contacts to at least two points with different potentials, at the same time preventing deleterious short circuits. Another way for transferring power to a load, starting from an electrical tension, can consist in the use of wireless energy transmission systems, based for example on inductive or capacitive coupling between a transmission system and a receiving system, when the transmission system is located on a charger device while the receiving system is located on a user device to be supplied/charged, which is separate and independent of the supplier/charger device.

Typically, in the field of systems based on inductive coupling, a transmission antenna is used, for example in a reel or spiral form, located on the user device to be powered. In this way, even without a galvanic connection between the primary and second circuits, electrical and electronic devices of various nature can be supplied.

As regards, on the other hand, systems based on a capacitive coupling, transmitting armatures are sued, for example made with conductive areas possibly insulated from the environment by means of dielectric material, which face like receiving armatures, thus constituting at least two electrical capacitances. By applying a tension wave in inlet to the electrical capacitances, it is possible to transmit electrical power. Each electrical capacitor supplied with a tension wave can be considered as an impedance, so that by means of a frequency of the tension wave that is sufficiently high and/or by means of sufficiently large electrical capacitances and/or by means of a tension wave having a sufficiently high tension, it is advantageously possible to obtain in outlet from the electrical capacitor couple a tension wave that is sufficiently high and useful for charging the load.

To realise this second functioning scheme of a wireless supply and/or charging device, it is advantageous for a first armature of each of the capacitances to be installed on a user device to be supplied (for example a mobile telephone, computer, television and the like) and for the second armature of each of the capacities to be installed on the charging device, defining thereon an appropriate supply surface. In this way, by nearing the user device to the charging device or vice versa, the armatures installed on each thereof realise the above-mentioned coupling and transmitting capacitances of the electrical energy.

As mentioned in the foregoing, in order to obtain high performance from the capacitive systems, it is generally possible to considerably increase the frequency of the tension applied to the transmitting armatures and/or the area of the armatures and/or applying to the armatures a tension wave having a sufficiently high amplitude.

As the area of the armatures is typically constrained to the geometry of the user device and the charging surface of the charging device, and as a large increase in the amplitude of the tension would determine security problems, as well as an increase of the dimensions and the costs of the system (for example owing to the transformers necessary for the high tensions in play), it follows that the best way for obtaining high performance in capacitive systems is to significantly increase the frequency of the tension waves applied to the transmitting armatures.

An extremely advantageous way for obtaining the result consists in the use of electrical circuits realised following totally resonant layouts, in which the circuit topology and the piloting system enable almost completely eliminating dynamic losses in the switches, thus enabling high switching frequencies and low losses. A category of wireless circuits which advantageously attains these objectives derives from the appropriate modification of the amplifiers of class E, F or E/F.

An example of this wireless supply/recharging system is described for example in an international patent application filed on Oct. 10, 2013 having number WO 2013/150352.

A typical problem of short-range wireless supply/recharging systems, both of inductive and capacitive type, consists however in having to position the user device to be supplied/charged in a precise position with respect to the charging device.

In the case of inductive systems, this problem can be obviated by creating transmission antennas able to generate a magnetic induction field in a quite large spatial zone (for example with solenoids of larger dimensions). On the contrary, this approach considerably worsens the energy efficiency of the system, increases the electromagnetic pollution, does not allow control of the single device supplied by the energy transmitted, and does not enable transmission of energy selectively internally of the portion of space invested by the magnetic field generated. These problems can be reduced by using a plurality of solenoids of smaller dimensions, possibly positioned so as to guarantee partial superposing between the fields generated, but this leads to a considerable increase in costs and dimensions of the system, and in any case does not eliminate the problems of low energy efficiency which characterise all the inductive systems.

Capacitive systems too, though guaranteeing greater energy efficiency, require a correct aligning between the user device and the charging device. In fact, within certain limits, the capacitive system tolerates dealignments between the transmitting armatures and receiving armatures, while beyond these limits it manifests a significant drop in performance.

To at least partly mitigate this drawback, an appropriate design plan is possible for the transmitting and/or receiving armatures. For example, correct functioning of the capacitive system can be guaranteed irrespective of the angle between the user and the charging device, by using armatures having a radial symmetry design. Likewise, the capacitive supply can be guaranteed to function regardless of a shifting of the user device in perpendicular directions, for example by using armatures with single- or two-dimensional cycle types.

On the contrary, no design of the armatures enables making the transmission of electrical power independent at the same time from the shift and the rotation of receiving armatures with respect to the transmitting armatures, so it is not commonly possible in any way to position the device to be charged on the charging device and always guarantee that the coupling between the armatures enables transmission of sufficient energy, without there being excessive loss.

As well as this, solutions at present available do not enable flanking, with random positioning and orientation, one or more user devices to be charged at a charging surface, at the same time ensuring that the surface charges only the mentioned devices, which does not activate with respect to other objects, and does not emit electromagnetic waves in the zones where nothing is resting on the charging surface.

An aim of the present invention is therefore to obviate the mentioned drawbacks, and in particular to realise a wireless transmission system of electrical energy by means of a capacitive coupling able to charge devices located randomly in proximity of a charging surface.

A further aim of the invention is to realise a wireless transmission system of the energy by means of a capacitive coupling which enables charging a plurality of devices contemporaneously.

A further purpose of the invention is to obviate or minimise emissions at the transmission areas not located in proximity of a device to be supplied.

A further aim of the invention is to enable a further increase in the frequencies of the tension waves applied to the coupling capacitances, entirely to the advantage of the power density of the supply surfaces, thus guaranteeing low system costs and scalability, therefore reproducible for small or large supply and transmission surfaces.

DISCLOSURE OF THE INVENTION

These and other aims are attained by the characteristics reported in the independent claims. The dependent claims delineate preferred and/or particularly advantageous aspects of the invention.

In particular, an embodiment of the invention discloses an apparatus for transferring power to an electrical load, comprising:

predisposing a charging device comprising an assembly of at least three transmitting armatures and a primary electrical circuit able to connect each transmitting armature to a tension generator (independently of one another), a user device separate and independent from the charging device, which comprises the electrical load, at least a pair of receiving armatures, and a secondary electrical circuit able to connect the receiving armatures to the electrical load, the pair of receiving armatures being faceable to at least a pair of transmitting armatures of the charging device realizing there-with at least two distinct electrical capacitors, an electronic system for monitoring and selecting, connected to the primary circuit of the charging device, which electronic system is configured so as to identify a first sub-assembly of transmitting armatures (at least one) which face one of the armatures of the receiving armatures of the user device, and so as to identify a second sub-assembly of transmitting armatures (at least one) which face the other receiving armature of the user device, and an electronic command system connected to the primary circuit of the charging device, which is configured so as to command the primary circuit to apply, between the transmitting armatures of the first and the second sub-assembly, a difference in electrical tension that is periodically variable over time.

It is immediately specified that the control system can depend or be incorporated in a monitoring and selection system.

It is further specified that the monitoring and selection system can also be configured so as to identify a third sub-assembly of transmitting armatures (even none) which are not facing any receiving armature of the user device. The control system can also be configured so as to apply to the third sub-group a different electrical tension, possibly nil or constant.

It is further specified that the monitoring and selection system can also be configured so as to measure the tension and/or current and/or power transferred to each user device. In line with this, the command system can be configured so as to command the primary circuit to apply, between the transmitting armatures of the first and the second sub-assembly, an electrical tension difference that is periodically variable over time between the armatures transmitting the first and the second sub-system for transferring to each user device the correct tension and/or current and/or power.

With this solution, the transmitting armatures substantially define a supply surface on which the user device can be supported in many different positions or orientations, in each of which it is always possible to guarantee that the receiving armatures are singly superposed on at least a respective armature of the transmitting armatures, realising at least two distinct electrical capacitances. In this way, by identifying the transmitting armatures which face the receiving armatures, and by applying to them a tension difference that is variable over time, the primary circuit applies to the electrical capacitances realised thereby a tension wave that transmits to the secondary circuit of the user device and therefore to the load.

Using a sufficiently high number of transmitting armatures it is further possible to define a sufficiently large surface to be able to house one or more user devices, the receiving armatures of each of which will always be singly superposed on at least a respective transmitting armature of the supplier device.

All the transmitting armatures which do not face any receiving armature can be kept switched off, thus guaranteeing negligible emissions in all parts of the supply surface on which no user device is supported.

In an aspect of the invention, the receiving armature of the user device can be subdivided into a plurality of plates of small dimensions, without modifying the functioning principle of the apparatus. The dimension and the form of the receiving armature can be different for different user devices and, internally of each single user device, for each receiving armature, for example as a function of the dimensions of the device and the geometric constraints present on the device, as well as the power necessary for the functioning of the user device.

In a further aspect of the invention, the transmitting armatures of the supplier device can be reciprocally arranged in space in a more or less regular way, contiguous to or distant from one another. For example, the transmitting armatures can be arranged in a single-dimensional distribution, i.e. reciprocally aligned to form a single row. Alternatively, the transmitting armatures can be distributed in a plurality of dimensions, for example they can be distributed in a matrix structure, in which the transmitting armatures are aligned on rows and columns substantially like the nodes of a matrix or a grid. The transmitting armatures can have various dimensions and/or geometrical shapes, without thus altering the functioning principle of the apparatus. Transmitting armatures with different forms and/or dimensions can be present on the same device. The transmitting armatures can further be distributed on a rigid or flexible support, hard or soft, planar or not planar, of any shape, thickness or dimension. For example, the transmitting armatures of the supplier device can be realised by applying conductors in the form of plates, sheets, leaves or other formats on a thick or slim dielectric substrate, hard or soft or by embedding the conductors between two layers of dielectric material, or by modifying the electric properties of a non-conductive material so that it becomes locally conductive.

As regards the secondary circuit of the user device, in an aspect of the invention it can comprise at least an electrical inductance connected in series to the receiving armatures. The secondary electrical circuit can further comprise a tension rectifier connected between the receiving armatures and the load, and possibly an adapting circuit of the load (for example a DC/DC circuit or another like circuit).

As regards the primary circuit of the supplier device, in an aspect of the invention it can comprise:
  a first and a second electrical conductor, which are electrically connected to the tension generator in such a way as to be subjected to a constant difference of electrical tension (for example, the first electrical conductor can be connected to the tension generator and the second electrical conductor can be earthed), and
  a plurality of electrical switches, each of which is able to electrically connect a respective transmitting armature selectively with the first or the second electrical conductor.

With this solution, the electronic command system can be configured so as to pilot the electrical switches so that the transmitting armatures (at least one) which face one of the receiving armatures of the user device are maintained constantly connected to one of the two conductors, for example the lowest potential conductor (referring for example to the earthing), while the transmitting armatures (at least one) which face the other receiving armature of the user device are cyclically connected alternatively to the electrical conductor having the highest potential and to the electrical conductor having the lowest potential.

Alternatively, the electronic command system can be configured so as to pilot the electrical switches so that the transmitting armatures (at least one) which face a first of the receiving armatures of the user device are cyclically connected alternatively to the highest potential electrical conductor and the lowest potential conductor, while the transmitting armatures (at least one) which face the other receiving armature of the user device are likewise cyclically connected alternatively to the electrical conductor having the highest potential and to the electrical conductor having the lowest potential, but in counter-phase (shifted by 180° in vector notation) or with an appropriate step with respect to the transmitting armatures facing the first receiving armature of the user device.

In this way, a tension wave is overall applied to the pair of electrical capacitances realised by the transmitting armatures and receiving armatures superposed on one another, which thus transmits to the load placed on the user device.

Other possible control modes for guaranteeing that a tension wave is overall applied to the load located on the user device are all valid piloting alternatives and substantially alike to those described.

This solution in practice includes the switches having the function of generating the tension wave and the selective activating function of the transmitting armatures.

In an alternative embodiment, the primary electrical supply circuit can comprise:
  a first and a second electrical conductor, which are electrically connected to the tension generator via an inverter system able to generate and apply to the first conductor a time-variable tension while maintaining the second conductor at a constant tension (for example earthed), and
  a plurality of electrical switches, each of which is able to electrically connect a respective transmitting armature selectively with the first or the second electrical conductor.

With this solution, which is configured as a variant of the preceding one, the electronic command system can be configured so as to pilot the electrical switches so that the transmitting armatures (at least one) which face one of the receiving armatures of the user device are maintained constantly connected to the second conductors, for example the lowest potential conductor (for example earthed), while the transmitting armatures (at least one) which face the other receiving armature of the user device are constantly kept connected to the first conductor, so as to receive the electrical tension wave produced by the inverter system.

In this second solution in practice the generating of the tension wave is carried out by the inverter system and the switches are occupied only with the selective activating function of the transmitting armatures.

As for the switches used in these first two embodiments of the invention, each of them can be made for example with at least a bipolar transistor, IGBT, MOSFET, MEMS switch, relay or solid state relay, CMOS couple or any other type of tension switching system.

In a third embodiment of the invention, the primary supply circuit of the supplier device can comprise:
  a first and a second electrical conductor, which are electrically connected to the tension generator in such a way as to be subjected to a constant difference of electrical tension (for example, the first electrical conductor can be connected to the tension generator and the second electrical conductor can be earthed), and
  a plurality of excitant electrical modules connected in parallel between the first and second electrical conductor and singly connected to a respective transmitting armature, each of which comprises a pair of switches connected in series and between which a central node is comprised, electrically connected to the respective transmitting armature.

In practice, each excitant module has a high-tension switch connected to the electrical conductor having the highest potential (for example the first) and a low-tension switch directly connected to the electrical conductor having the lowest potential (for example the second), between which the electrical connection to the respective transmitting armature is derived.

With this third solution, the electronic command signal of the apparatus can be configured so as to pilot the switches of the excitant module according to the following strategy.

For excitant modules connected to the transmitting armatures (at least one) which face a first of the receiving armatures of the user device, the high-tension switch is piloted such as to remain switched off statically (always off) while the low-tension switch is piloted so as to turn on and off cyclically at high frequency, in this way exciting the transmitting armature and the receiving armature facing it with a high-frequency tension wave.

For excitant modules connected to the transmitting armatures (at least one) which face a further receiving armature of the user device, the low-tension switch is piloted such as to remain switched off statically (always off) while the high-tension switch is piloted so as to remain on statically (always on) or, alternatively, is piloted so as to turn on and off cyclically at high frequency, with a frequency and phase that are appropriate with respect to the low-tension switch of the excitant modules connected to the transmitting armatures which face the first receiving armature of the user device, for example in synchrony with respect to those facing the first armature.

In a different strategy, the electronic command system of the apparatus can be configured so as to pilot the switches of the excitant module in the following way.

For excitant modules connected to the transmitting armatures (at least one) which face a first of the receiving armatures of the user device, the low-tension switch is piloted such as to remain switched off statically (always off) while the high-tension switch is piloted so as to turn on and off cyclically at high frequency, in this way exciting the transmitting armature and the receiving armature facing it with a high-frequency tension wave.

For excitant modules connected to the transmitting armatures (at least one) which face a further receiving armature of the user device, the high-tension switch is piloted such as to remain switched off statically (always off) while the low-tension switch is piloted so as to remain on statically (always on) or, alternatively, is piloted so as to switch on and off cyclically at high frequency, with a frequency and phase that are appropriate with respect to the high-tension switch of the excitant modules connected to the transmitting armatures (at least one) which face the first receiving armature of the user device, for example in synchrony with respect to those facing the first armature.

In a third strategy, the high and low tension switches connected to the transmitting armatures (at least one) which face a first transmitting armature can be piloted such as to switch on and off at high frequency and alternatingly, and the high and low tension switches connected to the transmitting armatures facing the other receiving armature can be piloted so as also to switch on and off alternatingly at high frequency, with a frequency and phase that are appropriate with respect to the high-tension switch of the excitant modules connected to the transmitting armatures (at least one) which face the first receiving armature of the user device, for example in synchrony with respect to those facing the first armature.

In a fourth strategy, the high and low tension switches connected to the transmitting armatures which face a first of the receiving armatures can be piloted such as to switch on and off at high frequency and alternatingly, while the high and low tension switches connected to the transmitting armatures facing the other receiving armature can be piloted statically, for example high-tension switches switched on statically (always on) and low tension switches switched off statically (always off) or, alternatively low-tension switches switched on statically (always on) and high-tension switched off statically (always off).

In any case, a valid alternative is any piloting able to prevent short-circuits between the conductor placed at higher potential and the conductor at low potential and able to generate, on the receiving armatures, a tension wave able to charge the load.

In an aspect of the third embodiment, the primary electrical circuit of the charger can comprise an inductance (known as a choke) connected in series between the tension generator and the first electrical conductor, and possibly a capacitor (known as a tank) connected between the first electrical conductor and the second electrical conductor.

The tank capacitor might however be partly or totally eliminated by exploiting for example the parasitic capacitance of the switches (for example MOSFETs) of the excitant modules.

In a further aspect of this third embodiment, each excitant module can comprise an inductance connected between the central node and the respective transmitting armature.

In this way, the inductance or inductances in series with the armatures of the secondary circuit can be partly eliminated, for example so as to reduce the sizes of the user device without the transmission apparatus being conceptually altered.

In a further aspect of this third embodiment, each excitant module can comprise an electrical capacitance connected between the central node and the second terminal of the primary circuit.

In this way, the tank capacitor can also be partially or totally eliminated.

The presence of these reactive components, which prevent short circuits between the high-tension conductor and the low-tension conductor, even in a case of transients during which the high-tension switch and the low tension switch of each excitant module are both on, means that the command system can be configured so as to perform the following strategy.

For excitant modules connected to the transmitting armatures (at least one) which face a first of the receiving armatures of the user device, the high-tension switch is piloted so as to remain switched on statically (always on) while the low-tension switch is piloted so as to turn on and off cyclically at high frequency, in this way exciting the transmitting armature and the receiving armature facing it with a high-frequency tension wave.

For excitant modules connected to the transmitting armatures (at least one) which face the other (second) receiving armature of the user device, the high-tension switch is piloted such as to remain switched off statically (always off) while the low-tension switch 310 is piloted so as to remain switched on statically (always on).

Alternatively, again as regards the excitant modules connected to the transmitting armatures (at least one) which face the second receiving armature, the low-tension switch can be piloted synchronously with respect to the low-tension switches of the excitant modules connected to the transmitting armatures facing the first receiving armature, or with a shift and/or a frequency such as to enable in any case the current circulation on the load.

In a different strategy, the electronic command system of the apparatus can be configured so as to pilot the switches of the excitant module in the following way.

As regards the excitant modules connected to the transmitting armatures (at least one) which face the first of the receiving armature, the high-tension switch and the low-tension switch can be piloted synchronously so as to turn on and off cyclically at high frequency (both on or off at the same time), in this way exciting the transmitting armature and the receiving armature facing it with a high-frequency tension wave.

As regards the excitant modules connected to the transmitting armatures (at least one) which face the second receiving armature, the high and low tension switches can be piloted in phase opposition (shifted by 180° in vector notation) with respect to those of the excitant modules connected to the transmitting armatures facing the first receiving armature.

In other words, if the high-tension switch of the excitant modules connected to the transmitting armatures facing the first receiving armature is switched on, the high-tension switch of the excitant modules connected to the transmitting armatures facing the other receiving armature is switched off, and likewise if the low-tension switch of the excitant modules connected to the transmitting armatures facing the first receiving armature is switched on, the low-tension switch of the excitant modules facing the other armature is switched of, and vice versa.

In any case, the piloting system can be modified with respect to the illustrated alternatives, as in any case any piloting is effective for guaranteeing that between the receiving armatures a potential difference is installed that can charge the load.

In all the above-delineated cases, as regards the excitant modules connected to the transmitting armatures which are not facing any receiving armature, the high-tension switch can be kept off statically (always off) while the low-tension switch can be kept either on or off, so as to connect the respective transmitting armature to the low-potential conductor (for example earthed) or leave it floating.

As regards the pair of switches in all the above-mentioned cases, it can be made as a pair of bipolar transistors or IGBT of pnp or npn type, in any combination (for example only npn type, only transistors of pnp type, or a pnp transistor and an npn transistor), and can also be realised using MOSFETs in any combination (only p-MOS, CMOS pair constituted by an n-MOS and a p-MOS), with relays, solid-state relays, MEMS switches or any other switch. By way of example, each excitant module can be advantageously realised using a p-MOS as a high-tension switch and a n-MOS as a low-tension switch.

This structure constitutes an easily-pilotable CMOS pair, low-cost and easy to integrate even in a single chip with present semiconductor technologies, realising an apparatus able to manage a particularly extended surface of transmitting armatures with extremely low costs.

The assembly of the reactive electrical components (transmitting armatures, receiving armatures and possibly condensers and inductors, including parasites of the switches and the circuit itself) of this third embodiment (in all its variants) can be tuned to resonate at a same or close piloting frequency as at least one of the switches of each excitant module. Further, by appropriately dimensioning these electrical components, the complete circuit of the transmission apparatus, constituted by the primary circuit and the secondary circuit coupled by the transmitting armatures and the receiving armatures, can be likened to amplification circuits of a resonant type, for example amplifiers of class E, F, E/F or the like. In this way, the losses in the above-mentioned circuit can be very low, almost effectively zero, as the resonating circuits (for example in class E, F, E/F or the like) are tuned so as to eliminate or at least minimise all losses, thus with performance very much better than those of any non-resonating inductive or capacitive system. Further, by virtue of the high number of small-dimension armatures that can be realised, and consequently the low currents that cross the single switches of each excitant module, it is easy to considerably increase the functioning frequencies with respect to a system constituted by only two large-dimension armatures piloted by switches which manage the whole power transferred to the load, as typically the switches suitable for managing small currents are characterised by negligible parasitic phenomena (for example low parasitic gate capacitances for MOSFETs) and therefore they are more suitable for reaching even very high frequencies with respect to the switches suitable for managing high currents.

In a fourth embodiment of the invention, the primary electrical circuit of the supplier device can comprise:
 a first and a second electrical conductor, which are electrically connected to the tension generator in such a way as to be subjected to a constant difference of electrical tension (for example, the first electrical conductor can be connected to the tension generator and the second electrical conductor can be connected to earth), and
 a plurality of excitant electrical modules connected in parallel between the first and second electrical conductor and singly connected to a respective transmitting armature, each of which comprises a pair of switches connected in series and between which a central node is comprised, electrically connected to the respective transmitting armature.

In practice, this embodiment is similar to the preceding one, from which it differs only in that it replaces one of the two switches of each excitant module (preferably the high-tension one) with an appropriate inductance.

With this third solution, the electronic command signal of the apparatus can be configured so as to pilot the switches of the excitant module in the following way.

For excitant modules connected to the transmitting armatures (at least one) which face a first of the receiving armatures of the user device, the only switch is piloted such as to switch on and off cyclically at high frequency.

For excitant modules connected to the transmitting armatures (at least one) which face the other receiving armature of the user device, the only switch is piloted such as to switch on and off cyclically at high frequency, in synchrony but in opposite phase with respect to the switches of the excitant modules of the first sub-assembly (shifted by 180° in vector notation) with respect to the excitant modules which are connected to the transmitting armatures facing the first receiving armature.

In this way the armatures of the first group will be excited with a periodic tension wave, while the armatures of the second group will be excited with the same tension wave, but shifted by a quantity of half the period (180° in vector notation). The piloting enables always having the maximum potential difference between the transmitting armatures of the first and the second group, so that downstream of the receiving armatures it is possible to collect energy useful for charging the load.

It is possible to modify the piloting of the system, for example by varying the shift and/or frequency of excitation and/or the form of the piloting, in any case ensuring having energy reception useful for charging the load downstream of the receiving armatures.

As for the excitant modules connected to the transmitting armatures which are not facing any receiving armature, the only switch can be kept off statically (always off).

Also in this fourth embodiment, the primary electrical circuit of the charger can comprise an inductance (known as a choke) connected in series between the tension generator and the first electrical conductor, and possibly a capacitor (known as a tank) connected between the first electrical conductor and the second electrical conductor.

The tank capacitor can however be partially or totally eliminated by exploiting for example the parasitic capacitance of the switches of the excitant module. The choke inductance can also be partly or totally eliminated by means of an appropriate dimensioning of the inductances of each excitant module, as well as by exploiting the parasite inductances of the switch and the circuit.

The elimination of the choke inductance could guarantee, for example, that the transmitting armatures kept switched off are set at a continuous electrical tension, and therefore generate no electromagnetic pollution or losses and interact in no way with the surrounding environment.

In a further aspect of this fourth embodiment, each excitant module can comprise an inductance connected between the central node and the respective transmitting armature and/or an electrical capacitance connected between the central node and the second terminal of the primary circuit.

As regards the switch in any excitant module, it can be a bipolar transistor or an IGBT of pnp or npn type, or can be a MOSFET (n-MOS, p-MOS), a MEMS switch, a relay, a solid-state relay, or any other switch.

As in the preceding case, the assembly of the reactive electrical components (transmitting armatures, receiving armatures and possibly inductors) of this fourth embodiment can be tuned to resonate at a same or similar piloting frequency of the switch 340 of each excitant module 300. Further, by appropriately dimensioning these electrical components, the complete circuit of the transmission apparatus, constituted by the primary circuit and the secondary circuit coupled by the transmitting armatures and the receiving armatures, can be likened to amplification circuits of a resonant type, for example amplifiers of class E, F, E/F or the like. In this way, the losses in the above-mentioned circuit can be very low, almost effectively zero, as the resonating circuits (for example in class E, F, E/F or the like) are tuned so as to eliminate or at least minimise all losses, thus with performance very much better than those of any non-resonating inductive or capacitive system. Further, by virtue of the high number of small-dimension armatures that can be realised, and consequently the low currents that cross the single switches of each excitant module, it is easy to considerably increase the functioning frequencies with respect to a system constituted by only two large-dimension armatures piloted by switches which manage the whole power transferred to the load, as typically the switches suitable for managing small currents are characterised by negligible parasitic phenomena (for example low parasitic gate capacitances for MOSFETs) and therefore they are more suitable for reaching even very high frequencies with respect to the switches suitable for managing high currents.

Further, even with respect to the other embodiments delineated in the foregoing, this fourth embodiment is particularly advantageous so as to simplify the piloting and thus further increase performance, as the only switch present in each excitant module refers to the lower potential (for example earth) and thus can be piloted by extremely high-performance and economical drivers.

In an aspect common to all the above-delineated embodiments, the primary circuit piloting the transmitting armatures can be realised by a separate electronic card, which can be connected via cabling to the transmitting armatures.

Alternatively, the primary circuit can be realised partially or totally distributed, for example directly on the sub-layer on which the transmitting armatures are applied, using for example one or more superposed conductive layer (multilayer), each specially worked to realise appropriate conductive pathways, possibly separated by insulating layers and appropriately connected to one another by inter-layer conductive pathways, able to realise any one of the conceptual layouts described in the foregoing.

For example, a multilayer printed circuit can be realised with rigid or flexible, hard or soft dielectric sublayers, in which the transmitting armatures are realised on a first conductive layer and in which the electronic components are mounted and/or designed on the final conductive layer and are connected to the transmitting armatures, for example by means of common vias between the conductive layers.

In this way substantially small charging mats are obtained, having a slim thickness and possibly being cuttable into any shape without losing in terms of functionality, being very sturdy with respect to localised damage, and having a relatively low cost.

In a further aspect of the invention there is a further possibility of realising, as well as the passive components (such as inductors, capacitances, any resistors), also the active electronic components (for example the MOSFETS, other transistors or other components) of the primary circuit directly on slim layers, for example by means of TFT technology (thin film transistor) which has been for some time exploited in the form of flat screens or OFETs (organic field-effect transistor).

In a further aspect of the invention, common to all the above-described embodiments, the electronic monitoring and selection system can be configured so as to carry out a step of monitoring each transmitting armature of the charging device.

This step of monitoring can include supplying each transmitting armature with a predetermined electrical test signal and to measure a parameter of the circuit (for example the impedance of a component or a part of the circuit, the tension in one or more points, the current in one or more components or another physical and/or electrical property of the transmission circuit) of which the value is known previously in which the transmitting armature is facing a receiving armature or faces nothing, or where the behaviour is predictable as a function of the status.

Comparing the measured value with the known values of the monitored parameter, the monitoring and selection system is thus able to discern the specific condition of each single transmitting armature.

This monitoring step can be carried out at the same time or in sequence on all the transmitting armatures of the charging device with a single diagnostic procedure, which can be repeated continuously and periodically or when significant events occur.

Alternatively the monitoring step can be performed for each transmitting armature independently of the others, in continuous mode, periodical mode and/or when significant events occur.

Alternatively the step of monitoring can do without the test signal and directly use the monitoring of the properties during normal system functioning of the system so as to determine in real time the status of each armature and consequently modify piloting thereof.

As previously mentioned, the monitoring system can determine the power transmitted to each load, and therefore supply to the control system a retroactive system useful for controlling the power transmitted to the load. The control system can regulate the power transmitted to the load for example by activating a greater or smaller number of transmission armatures faced to each receiving armature, and/or the system can vary the frequency and/or the phase and/or the shape of the piloting signal of some of the transmitting armatures, so as to modify the electrical power transmitted to the load in this way.

Another embodiment of the present invention lastly provides a method for transferring power to an electrical charge, comprising steps of:
- predisposing a charging device comprising an assembly of at least three transmitting armatures and a primary electrical circuit able to connect each transmitting armature to a tension generator (independently of the others),
- predisposing a user device, separate and independent from the charging device, which comprises the electrical load, at least a pair of receiving armatures, and a secondary electrical circuit able to connect the receiving armatures to the electrical load, the pair of receiving armatures being faceable to at least a pair of transmitting armatures of the charging device realizing therewith at least two distinct electrical capacitors,
- identifying a first sub-assembly of transmitting armatures (at least one) which face an armature of the receiving armatures of the user device, and so as to identify a second sub-assembly of transmitting armatures which face the other receiving armature of the user device, and
- commanding the primary circuit to apply, between the transmitting armatures of the first and the second sub-assembly, an electrical tension difference that is periodically variable over time.

This power transmission method adopts the same concept as the apparatus described in the foregoing, and exhibits substantially the same advantages thereas.

All the aspects and the characteristics of the invention described with reference to the apparatus are therefore understood to be applicable also to the power transmission method. In particular, all the operations carried out by the electronic monitoring and selection system and by the electronic control system are to be considered as steps of the method of the invention.

BRIEF DESCRIPTION OF THE DRAWINGS

Further characteristics and advantages of the invention will emerge from a reading of the following description, provided by way of non-limiting example with the aid of the figures illustrated in the appended tables of drawings.

FIGS. 2, 3 and 4 are a plan view from above of the transmission surface of the apparatus of FIG. 1 in three alternative embodiments.

FIG. 12 is a view from below of a multilayer printed circuit which realises the charging device used in the apparatus of the invention.

FIG. 13 is a lateral view of FIG. 12.

PREFERRED EMBODIMENT OF THE INVENTION

Figure 1:
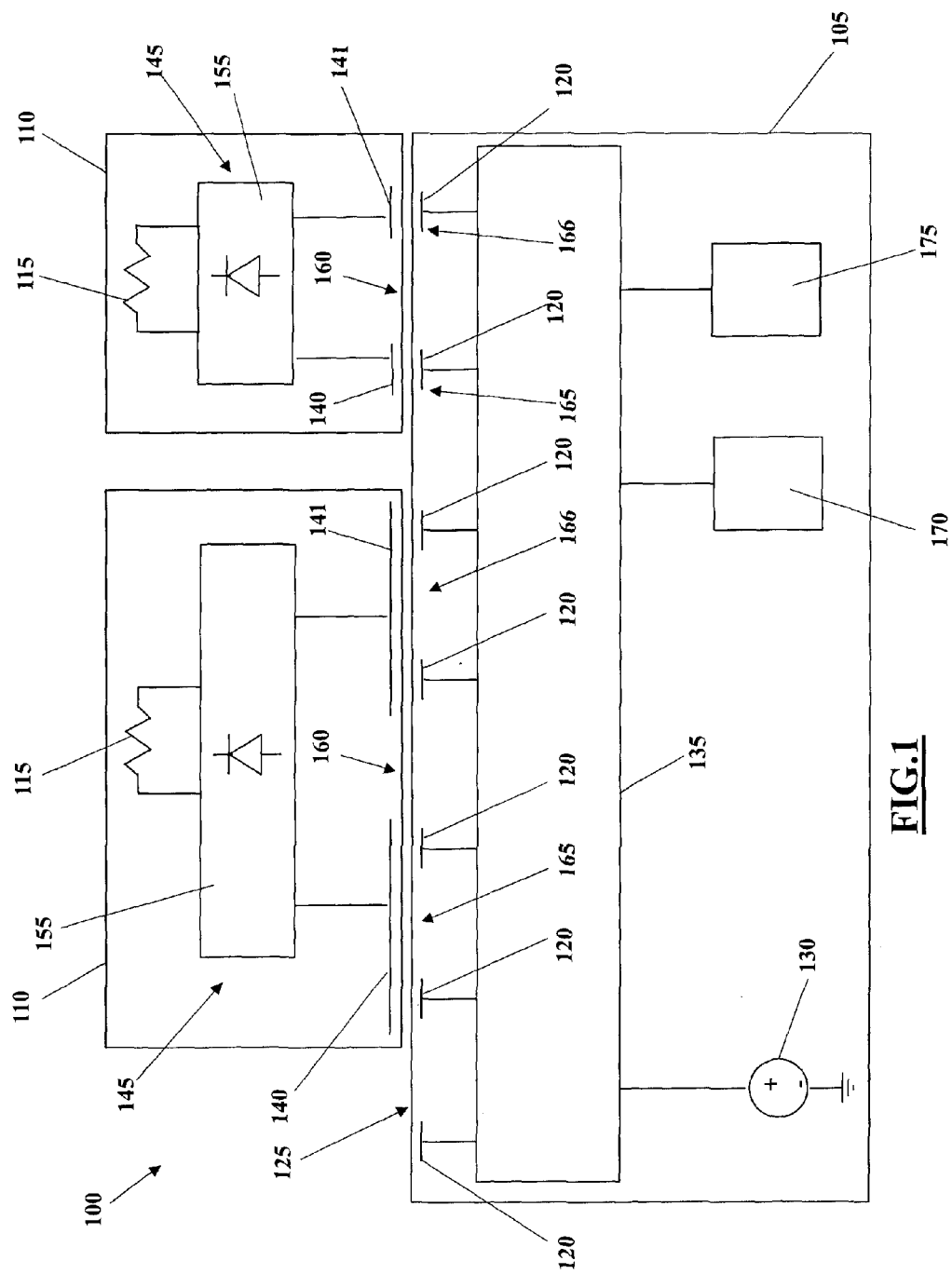
FIG. 1 is the schematic diagram of a wireless supply apparatus according to an embodiment of the present invention.

With reference to the general diagram of FIG. 1, the invention relates to an apparatus 100 for wireless transfer of electrical power from a charging device 105 to one or more user devices 110, each of which is physically separated from and independent of the charging device 105 and comprises an electrical load 115 which requires charging.

The user device 110 can be for example a telephone, a computer, a keyboard, a mouse, a tablet, a television, a lighting system, an implantable biomedical system, or any other electrical and electronic device which requires an electrical supply and/or for recharging for its internal batteries.

The charging device 105 can be made an independent object, for example provided with a dedicated casing, or can be incorporated in pre-existing structures, or applied to pre-existing structure, such as for example desks, tables, walls, dashboards, glove compartments, floors and others besides, as will more fully emerge from the following.

In detail, the charging device 105 comprises an assembly of transmitting armatures 120 which can be made for example of plates, sheets, leaves or another conductive element format. The number of transmitting armatures 120 must be no lower than three, but preferably it is much higher. The transmitting armatures 120 are arranged reciprocally flanked, for example coplanar, so as to overall define in the charging device 105 a transmission surface 125, which can be of any shape and dimension according to needs. In the figures the transmitting armatures 120 are shown distanced from the transmission surface 125 only for reasons of clarity. In reality it is preferable (though not necessary) that they are substantially flush with the transmitting surface 125, possibly covered by a preferably slim layer of dielectric material. The transmitting armatures 120 can be reciprocally arranged in the space in a more or less regular way, either contiguous or distanced from one another. For example, the transmitting armatures can be arranged in a single-dimensional distribution (see FIG. 2), i.e. reciprocally aligned to form a single row, or can be distributed in a plurality of dimensions, for example they can be distributed in a matrix structure (see FIGS. 3 and 4), in which the transmitting armatures 120 are aligned on rows and columns substantially like the nodes of a matrix.

As illustrated in the mentioned figures, the transmitting armatures 120 can have various dimensions and/or geometrical shapes. In particular, the shape and/or dimension of the transmitting armatures 120 can vary both among various models of the charging device 105 and internally of a same model of charging device 105.

The transmitting armatures 120 can further be distributed on a rigid or flexible support, soft or hard, planar or not planar, of any shape, thickness or dimension. For example, the transmitting armatures 120 of the supplier device can be realised by applying conductive sheets on a thick or slim dielectric substrate, or by embedding the conductive sheets between two layers of dielectric material, or by modifying the electric properties of a non-conductive material so that it becomes locally conductive.

Looking once more at FIG. 1, the charging device 105 further comprises an assembly of at least a tension generator 130, and a primary electrical circuit, denoted schematically by reference numeral 135, able to connect each transmitting armature 120 to a tension generator 130, independently of the others.

It is immediately specified that the tension generator 130 is in the present description taken to be any electrical device able to generate an electrical potential difference (tension) which remains substantially constant over time. This configuration might therefore be either one aimed at directly generating a constant tension at heads thereof, such as for example an electrical battery, but might also be a rectifier able to transform an alternating current, for example coming from a normal domestic electrical distribution grid, into a direct current, or might be a DC/DC converter able to transform a starting direct current into the appropriate tension able to supply the primary circuit 135.

The user device 110, in turn comprises at least a pair of receiving armatures 140 and 141, and a secondary electrical circuit, indicated in its entirety by 145 able to connect the receiving armatures 140 and 141 to the electrical load 115.

In some possible embodiments, the secondary electric circuit 145 of the user device 110 can comprise a tension rectifier 155 connected between the receiving armatures 140 and 141 and the load 115, and possibly an adapting circuit of the load (for example a DC/DC circuit or another like circuit).

The receiving armatures 140 and 141 can also be realised as plates, sheets, leaves or another format of conductor element. Each receiving armature 140 and 141 can possibly be made from a plurality of plates of small dimensions, appropriately connected to one another.

The receiving armatures 140 and 141 can be arranged reciprocally flanked, for example coplanar, so as to overall define in the charging device 110 a receiving surface 160 having a complementary shape to the transmission surface 125 of the charging device 105.

In the figures the receiving armatures 140 and 14 are shown distanced from the transmission surface 125 only for reasons of clarity. In reality, they are preferably in proximity of the emitting surface 125, possibly covered by a dielectric layer having a preferably slim thickness.

The dimension and/or the form of the receiving armatures 140 and 141 can be different for different user devices 110 both internally of each single user device 110, and for each receiving armature 110, for example as a function of the dimensions of the device and the geometric constraints present on the device, as well as the power necessary for the functioning of the user device. What is important is that the shape, dimension and arrangement of the receiving armatures 140 and 141 on the user device 110 and the number, shape, dimension and arrangement of the transmitting armatures 120 on the charging device 105, must be such that, by resting on or nearing the receiving surface 160 of the user device 100 on the transmission surface 125 of the charging device 105, the pair of receiving armatures 140 and 142 of the user device 110 is facing the at least a pair of transmitting armatures 120 of the charging device 105, for a plurality of positions and/or orientations of the user device 110 with respect to the charging device 105, preferably for any position and/or orientation of the user device 110.

In the figures the transmitting surface 125 and the receiving surface are shown reciprocally distanced only for reasons of clarity. In reality they are preferably in reciprocal contact or in any case in proximity of one another. In this way in all the above-mentioned positions and/or orientations of the user device 100, each receiving armature 140 and 141 will realise, with the respective sub-assembly of transmission armatures 120 (at least one) facing it, an electrical capacitor 165 and respectively 166. The pair of electrical capacitances 165 and 166 will therefore constitute impedance able to realise a wireless connection between the primary circuit 135 of the charging device 105 and the secondary circuit 145 of the user device 110.

The apparatus 100 therefore comprises an electronic system for monitoring and selecting, denoted schematically by reference number 170, for example a system based on a microprocessor, programmable logic, cabled logic, integrated circuit or another, possibly having appropriate analog or digital signal conditioning circuits, which is connected to the primary circuit 135 of the charging device 105 and which is configured so as to identify a first sub-assembly of transmitting armatures 120 which face a receiving armature 140, and a second sub-assembly of transmitting armatures 120 which face the other receiving armature 141 of the user device 110, and possibly for identifying a third sub-assembly of transmitting armatures 120 which are not facing any receiving armature 140 and 141 of the user device 110.

The monitoring and selection system 170 can also be configured so as to measure the tension and/or current and/or power transferred to each user device 110.

The apparatus 100 lastly comprises an electrical command system, denoted schematically by reference number 175. This command system 175 can also be based on a microprocessor, programmable logic, cabled logic, integrated circuit or another, and can be made a separate system to the monitoring and selection system 170 (as schematically illustrated in FIG. 1) or could be integrated in a single electronic control system which also integrates the monitoring and selection system 170.

In any case, the command system 175 is connected to the primary circuit 135 of the charging device 105, which is configured so as to command the primary circuit 135 to apply, between the transmitting armatures 120 of the first and the second sub-assembly identified by the monitoring and selection system 170, a difference in electrical tension that is periodically variable over time.

By applying this tension difference variable over time to the transmitting armatures 120 which face the receiving armatures 140 and 142, the primary circuit 135 applied to the electrical capacitances 165 and 166 realised thereby a tension wave that transmits to the secondary circuit 145 of the user device 110 and therefore to the load 115.

By varying the number of transmitting armatures 120 activated and/or the frequency and/or the form of the piloting signal of each transmitting armature 120, the command system 175 can effectively regulate the tension and/or the current and/or the power transferred to each load 115.

At the same time, all the transmitting armatures 120 which do not face any receiving armature can be kept switched off, thus guaranteeing negligible emissions in all parts of the transmission surface 125 on which no user device 110 is supported.

Using a sufficiently high number of transmitting armatures 120 it is in fact possible to define a transmission surface 125 large enough to be able to accommodate other user devices 110 too (as illustrated in the figures), which can be charged at the same time as the first and with the same modalities as delineated in the foregoing.

Starting from the general plant, the apparatus 100 can be applied in various embodiments, which mainly differ as regards the layout of the primary electrical circuit 135 of the charging device 105 and, consequently, as regards the modalities with which the command systems 175 commands it to realise the tension wave and apply it to the transmitting armatures 120.

Figure 5:
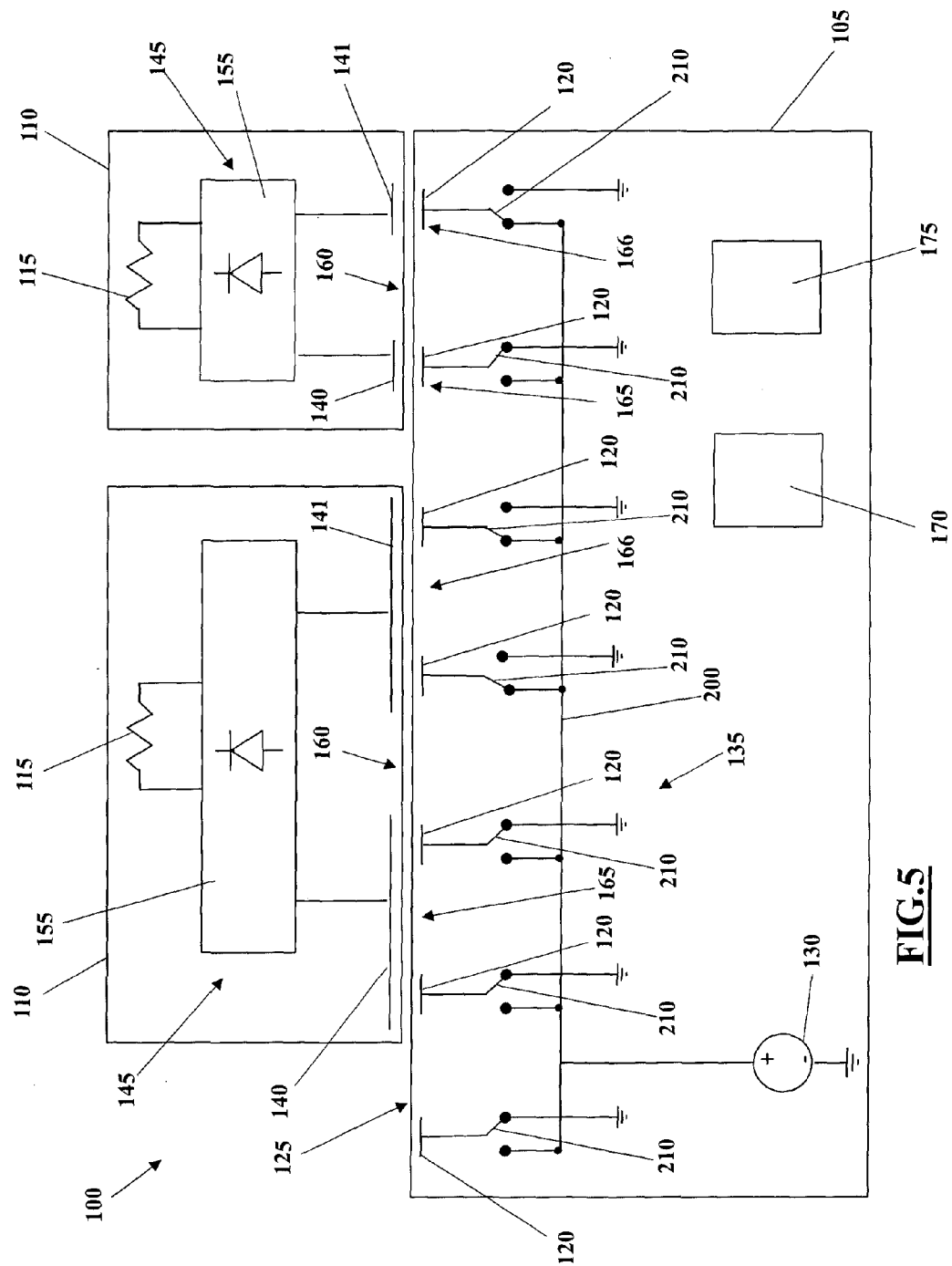
FIG. 5 is a circuit diagram of the apparatus of FIG. 1 in a first specific embodiment.

As illustrated in FIG. 5, a first embodiment can for example include the primary electrical circuit 135 having a first electrical conductor 200 connected directly to the positive clamp of the tension generator 130, and a second electrical conductor 205 connected to the negative clamp of the tension generator 130. In this way the tension generator applies, between the first and the second electrical conductor 200 and 205, an electrical tension difference that is substantially constant, greater at the first conductor 200 and lesser at the second conductor 205.

In this specific example too, the second electrical conductor 205 is an earth, so that at least the negative clamp of the tension generator 130 is earthed. It is however possible that in other embodiments the second conductor 205 can have a different potential.

The primary circuit 135 can further comprise a plurality of electrical excitant modules 210, in a number equal to the number of transmitting armatures 120. Each transmitting armature 120 is connected to one only of these switches 210, which are singly able to electrically connect a respective transmitting armature (120) selectively with the first electrical conductor 200 or the second electrical conductor 205 (in this case earthed). The switches can be for example bipolar transistors, IGBT, MOSFET, MEMS switches, relay or solid state relays, CMOS couples or any other type of tension interruption system.

With this simple circuit layout, to supply the charge 115 of each user device 110, the electronic command system 175 can be configured so as to pilot the electrical switches 210 so that the transmitting armatures 120 of the first sub-assembly, i.e. those (at least one) which face the receiving armature 140, are maintained constantly connected to one of the two conductors 200 or 205, for example the second conductor (referring in the example to earth), while the transmitting armatures 120 of the second sub-assembly, i.e. those (at least one) which face the other receiving armature 141, are cyclically connected alternatively to the first electrical conductor 200 having the highest potential and to the second electrical conductor 205 having the lowest potential (or vice versa).

Alternatively, the electronic command system can be configured so as to pilot the electrical switches 210 so that the transmitting armatures 120 of the first sub-assembly, i.e. those (at least one) which face the receiving armature 140, are maintained cyclically connected to the first conductor 200 having the higher potential and to the second conductor 205 having the lower potential, while the transmitting armatures 120 of the second sub-assembly, i.e. those (at least one) which face the other receiving armature 141, are analogically cyclically connected alternatively to the first electrical conductor 200 having the highest potential and to the second electrical conductor 205 having the lowest potential, but in counter-phase (shift of 180° in vector notation) with respect to the transmitting armatures 120 facing the receiving armature 140. In this way, a tension wave is overall applied to the pair of electrical capacitances 165 and 166 realised by the transmitting armatures 120 and receiving armatures 140 and 141 superposed on one another, which thus transmits to the load 115 placed on the user device 110.

Figure 6:
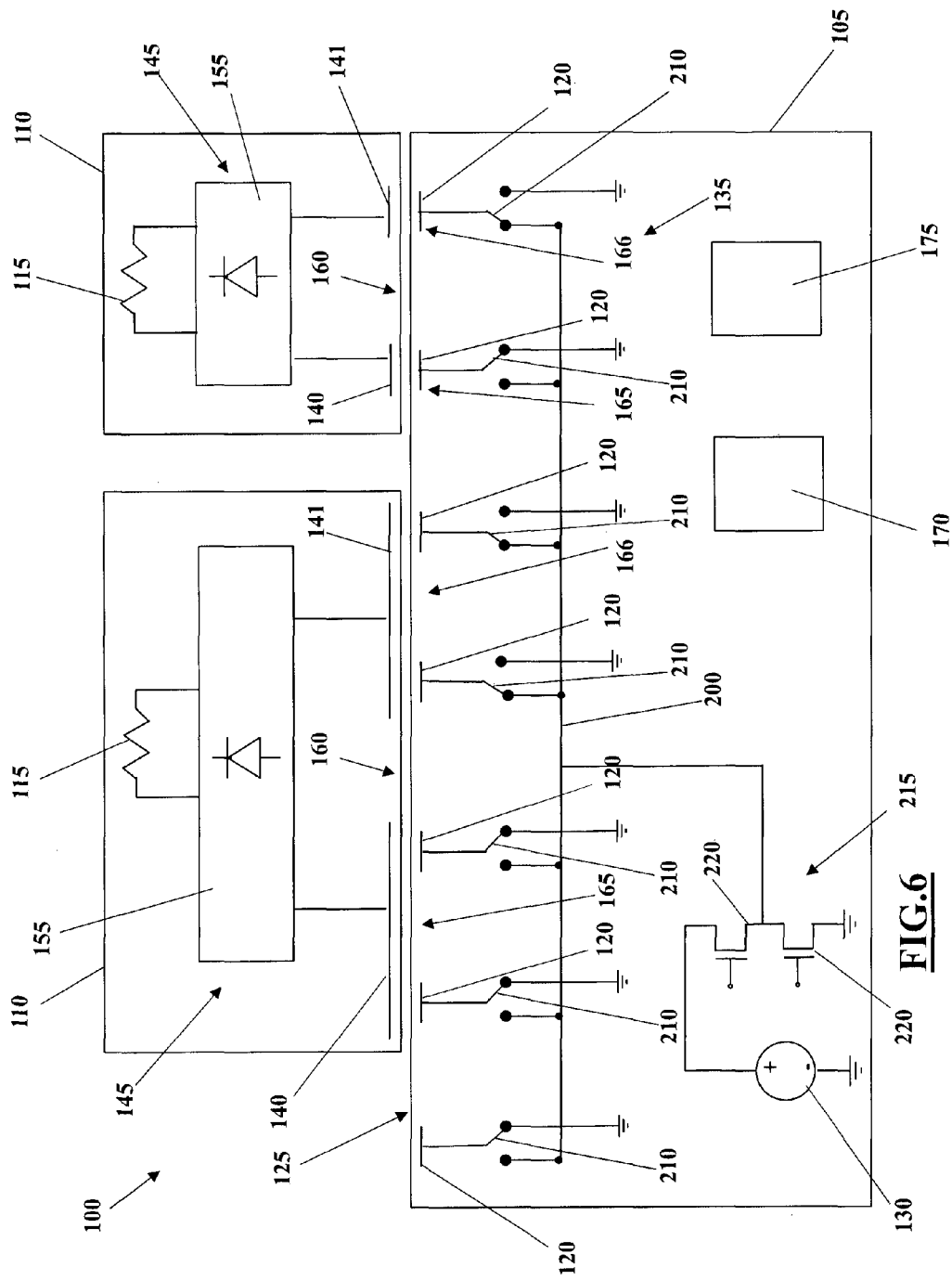
FIG. 6 is a circuit diagram of the apparatus of FIG. 1 in a second specific embodiment.

A second embodiment of the apparatus 100 is illustrated in FIG. 6. The primary circuit 135 of the second embodiment is entirely alike the previous one, with respect to which it differs only due to the fact of including an inverter system, generally denoted by 215, which is configured so as to transform the direct current in output from the tension generator 130 into a tension wave which is applied to the first electric terminal 200.

The inverter system 215 can for example comprise an electrical branch with two switches (e.g. transistors) 220 arranged reciprocally in series, which exhibits an end node connected to the positive claim of the tension generator 130, an opposite end node connected to the negative clamp of the tension generator 130 (in this case earthed) and a central node between the two switches 200 connected to the first electrical conductor 200.

In this way, by appropriately piloting the two switches 200, the inverter system 215 is able to apply to the first conductor 200 a tension wave, at the same time keeping the second conductor 205 at a constant reference tension (in the example earthed).

With this variant, the tension wave is thus generated upstream of the switches 210 which have only the function of activating or not the transmitting armatures.

Consequently, to charge the load 115 of each user device 110, the electronic command system 175 can be simply configured so as to pilot the switches 210 so that the transmitting armatures 120 of the first sub-assembly, i.e. those (at least one) which face the receiving armature 140, are maintained constantly connected to the second conductor 205 (in the example earthed), while the transmitting armatures 120 of the second sub-assembly, i.e. those (at least one) which face the other receiving armature 141, are kept constantly connected to the first conductor 200 so as to receive the electrical tension wave produced by the inverter system 215.

Figure 7:
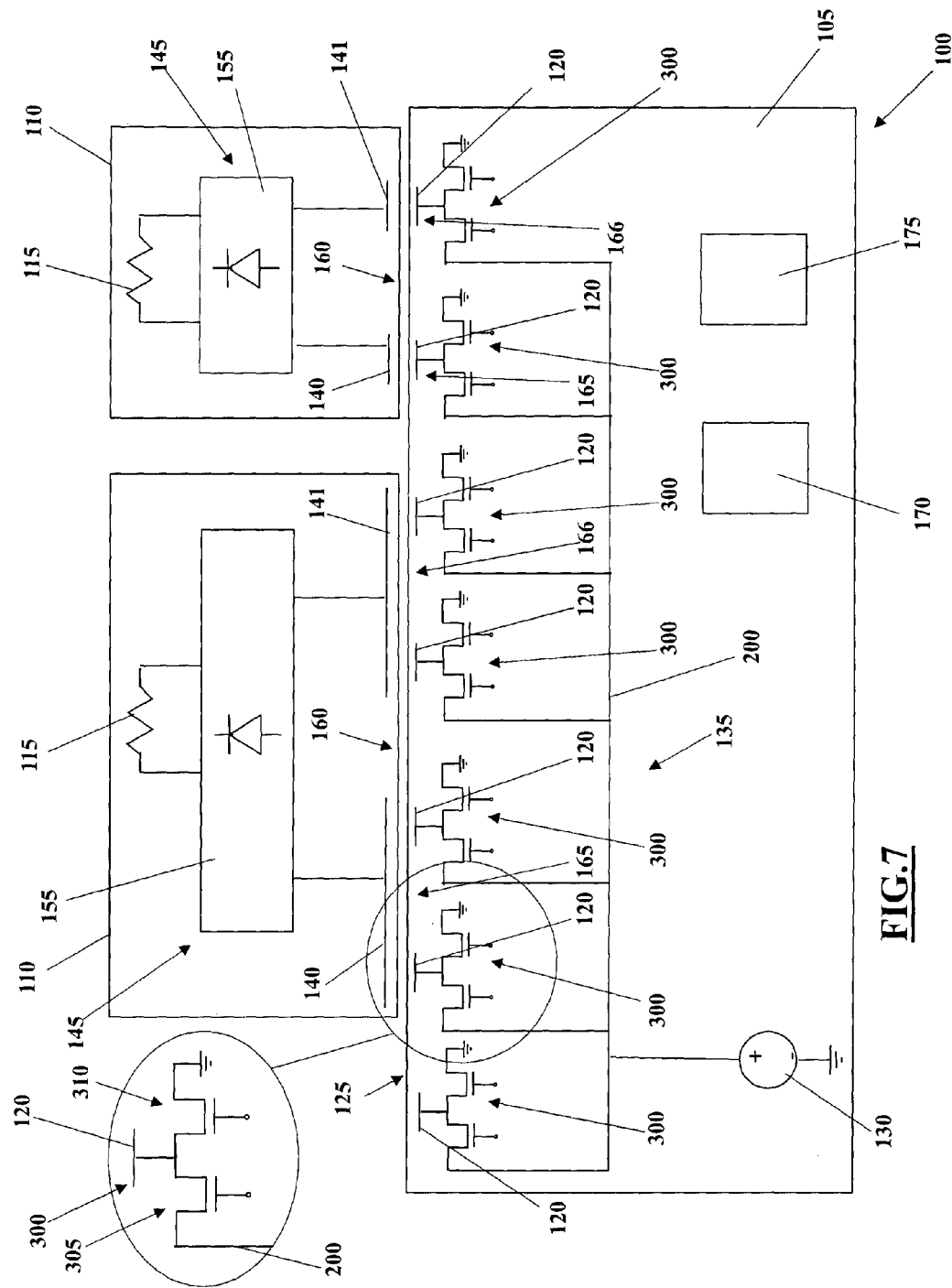
FIG. 7 is a circuit diagram of the apparatus of FIG. 1 in a third specific embodiment.

In a third embodiment of the invention, illustrated in FIG. 7, the primary electrical circuit 135 of the charging device 105 can comprise, as in the first embodiment, a first electrical conductor 200 connected directly to the positive clamp of the tension generator 130 and a second electrical conductor 205 connected to the negative clamp of the tension generator 130, so that the tension generator 130 applies, between the first and the second electrical conductor 200 and 205, an electrical tension difference that is substantially constant, greater at the first conductor 200 and lesser at the second conductor 205.

In this specific example too, the second electrical conductor 205 is an earth, so that at least the negative clamp of the tension generator 130 is earthed. It is however possible that in other embodiments the second conductor 205 can have a different potential.

The primary circuit 135 further comprises a plurality of electrical excitant modules 300, in a number equal to the number of transmitting armatures 120. Each transmitting armature 120 is connected to one only of the excitant modules 300, which are connected in parallel between the first and the second electrical conductor 200 and 205.

In particular, each excitant module 300 comprises an electrical branch having an end node connected to the first conductor 200 and an opposite end node connected with the second conductor 205 (in this case earthed). The branch comprises, between the two end nodes, a pair of switches connected in series, of which a high-tension switch 305 connected directly to the first conductor 200 (to which the greater tension is applied) and a low-tension switch 310 directly connected to the second conductor 205 (in this case earthed). Between these two switches 305 and 310, the electrical branch exhibits a central node connected with the respective transmitting armature 120.

The switches 305 and 310 can be a pair of bipolar transistors or IGBT of pnp or npn type, in any combination (for example only npn type, only transistors of pnp type, or a pnp transistor and an npn transistor), and can also be a pair of MOSFETs in any combination (only p-MOS, CMOS pair constituted by an n-MOS and a p-MOS), with relays, solid-state relays, MEMS switches or any other switch. By way of example, each excitant module 300 can be advantageously realised using a p-MOS as a high-tension switch 305 and a n-MOS as a low-tension switch 310. This structure constitutes an easily-pilotable CMOS pair, low-cost and easy to integrate even in a single chip with present semiconductor technologies.

With this circuit layout, to charge the load 115 of each user device 110, the electronic command system 175 of this variant of the third embodiment can be configured so as to pilot the switches 305 and 310 of the excitant modules 300 in the following way.

For excitant modules 300 connected to the transmitting armatures 120 of the first sub-assembly (at least one) which face the receiving armatures 140, the high-tension switch 305 is piloted such as to remain switched off statically (always off) while the low-tension switch 310 is piloted so as to turn on and off cyclically at high frequency, in this way exciting the respective transmitting armature 120 and the receiving armature 140 facing it with a high-frequency tension wave.

For the excitant modules 300 connected to the transmitting armatures 120 (at least one) which face the other receiving armature 141, the low-tension switch 310 is piloted such as to remain switched off statically (always off) while the high-tension switch 305 is piloted so as to remain on statically (always on) or, alternatively, is piloted so as to turn on and off cyclically at high frequency, with a frequency and phase that are appropriate with respect to the low-tension switch of the excitant modules connected to the transmitting armatures 120 which face the first receiving armature 140 of the user device, for example in synchrony with respect to those facing the first receive armature 140.

In a different strategy, the electronic command system 175 of the apparatus can be configured so as to pilot the switches 305 and 310 of the excitant module in the following way.

For excitant modules 300 connected to the transmitting armatures 120 (at least one) which face the receiving armatures 140, the low-tension switch 310 is piloted such as to remain switched off statically (always off) while the high-tension switch 305 is piloted so as to turn on and off cyclically at high frequency, in this way exciting the respective transmitting armature 120 and the receiving armature 140 facing it with a high-frequency tension wave. For excitant modules 300 connected to the transmitting armatures 120 (at least one) which face the other receiving armature 141, the high-tension switch 305 is piloted such as to remain switched off statically (always off) while the low-tension switch 310 is piloted so as to remain on statically (always on) or, alternatively, is piloted so as to turn on and off cyclically at high frequency, with a frequency and phase that are appropriate with respect to the high-tension switch 305 of the excitant modules 300 connected to the transmitting armatures 120 which face the first receiving armature 140 of the user device, for example in synchrony with respect to those facing the first receive armature 140.

In a third strategy, the high and low tension switches 305 and 310 connected to the transmitting armatures 120 which face a first receiving armature 140 can be piloted such as to switch on and off at high frequency and alternatingly, and the high and low tension switches 305 and 310 connected to the transmitting armatures 120 facing the other receiving armature 141 can be piloted so as also to switch on and off alternatingly at high frequency, with a frequency and phase that are appropriate with respect to the high and low tension switches 305 and 310 connected to the transmitting armatures 120 which face the first receiving armature 140, for example in synchrony with respect to those facing the first armature 140.

In a fourth alternatively strategy, the high and low tension switches 305 and 310 connected to the transmitting armatures 120 which face the first receiving armature 140 can be piloted such as to switch on and off at high frequency and alternatingly, while the high and low tension switches 305 and 310 connected to the transmitting armatures 120 facing the other receiving armature 141 can be piloted statically, for example high-tension switches 305 switched on statically (always on) and low tension switches 310 switched off statically (always off) or, alternatively low-tension switches 310 switched on statically (always on) and high-tension switches 305 switched off statically (always off).

Figure 8:
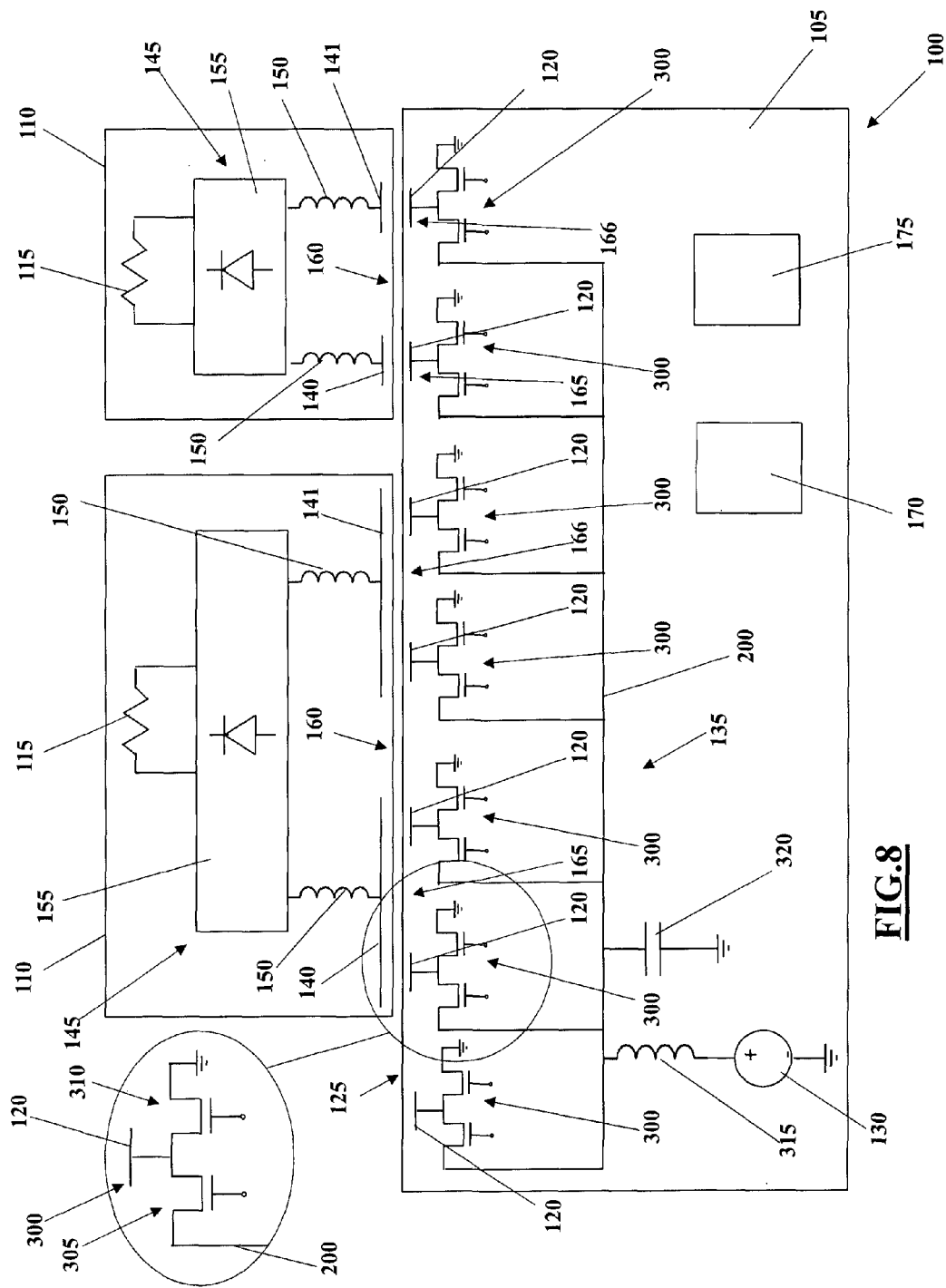
FIG. 8 is a variant of the circuit diagram of FIG. 7.

In a variant of this third embodiment, illustrated in FIG. 8, the secondary electrical circuit 145 of the user device 110 can comprise at least an electrical inductance 150 connected in series with each of the receiving armatures 140 and 141.

The primary electrical circuit 135 of the charger can further comprise a choke inductance 315 connected in series between the tension generator 130 and the first electrical conductor 200, i.e. in series with the excitant modules 300, and possibly an electrical tank capacitor 320 connected between the first electrical conductor 200 and the second electrical conductor 205.

The tank capacitor 320 can however be partially or totally eliminated by exploiting for example the parasitic capacitance of the switches 305 and 310 of the excitant module 300.

With this circuit layout, to charge the load 115 of each user device 110, the electronic command signal 175 of this variant of the third embodiment can be configured so as to pilot the switches 305 and 310 of the excitant modules 300 in the following way.

For the excitant modules 300 connected to the transmitting armatures 120 of the first sub-assembly (at least one) which face the receiving armatures 140, the high-tension switch 305 is piloted such as to remain switched on statically (always on) while the low-tension switch 310 is piloted so as to turn on and off cyclically at high frequency, in this way exciting the respective transmitting armature 120 and the receiving armature 140 facing it with a high-frequency tension wave.

For excitant modules 300 connected to the transmitting armatures 120 of the second sub-assembly i.e. those (at least one) which face the other receiving armature 141, the high-tension switch 305 is piloted such as to remain switched off statically (always off) while the low-tension switch 310 is piloted so as to remain switched on statically (always on), connecting the relative transmitting armature 120 to the second conductor 205 having a lower potential (in the example earthed).

Alternatively, the low tension switch 310 of the excitant modules 300 connected to the transmitting armatures 120 of the second sub-assembly can be piloted such as to switch on and off at high frequency and in phase with the low-tension switches 305 of the excitant modules which are connected to the transmitting armatures 120 of the first sub-assembly with a shift and/or a frequency such as to enable in any case circulation of current on the load.

In a different strategy, the electronic command system 175 of the apparatus can be configured in the following way.

For excitant modules 300 connected to the transmitting armatures 120 of the first sub-assembly i.e. those (at least one) which face the receiving armatures 140, the high-tension switch 305 and the low tension switch 310 can both be piloted so as to switch on and off cyclically at high frequency in phase with one another (both contemporaneously switched on or off).

For excitant modules 300 connected to the transmitting armatures 120 of the second sub-assembly i.e. those (at least one) which face the other receiving armature 141, the high-tension switch 305 and the low-tension switch 210 are also both piloted stage such as to switch on and off cyclically at high frequency and in phase with one another (both contemporaneously on or off), but in opposite phase with respect to the switches 305 and 310 of the excitant modules 300 which are connected to the transmitting armatures 120 of the first sub-assembly (i.e. shifted by 180° in vector notation).

With this approach, each transmitting armature 120 of the first and second sub-assembly functions as both an outward and as a return travel for the electrical current. On the contrary, the high-frequency switches 305 are to be piloted at high pressure, with a consequent complication of the driving system of the switches.

In all the above-described cases, the excitant modules 300 connected to the transmitting armatures 120 which are not facing any receiving armature 140 and 141 of any user device 110, the high-tension switch 305 can be kept off statically (always off) while the low-tension switch 310 can be kept either on or off, so as to connect the respective transmitting armature 120 to the second, low-potential conductor 120 (for example earthed) or leave it floating.

Figure 9:
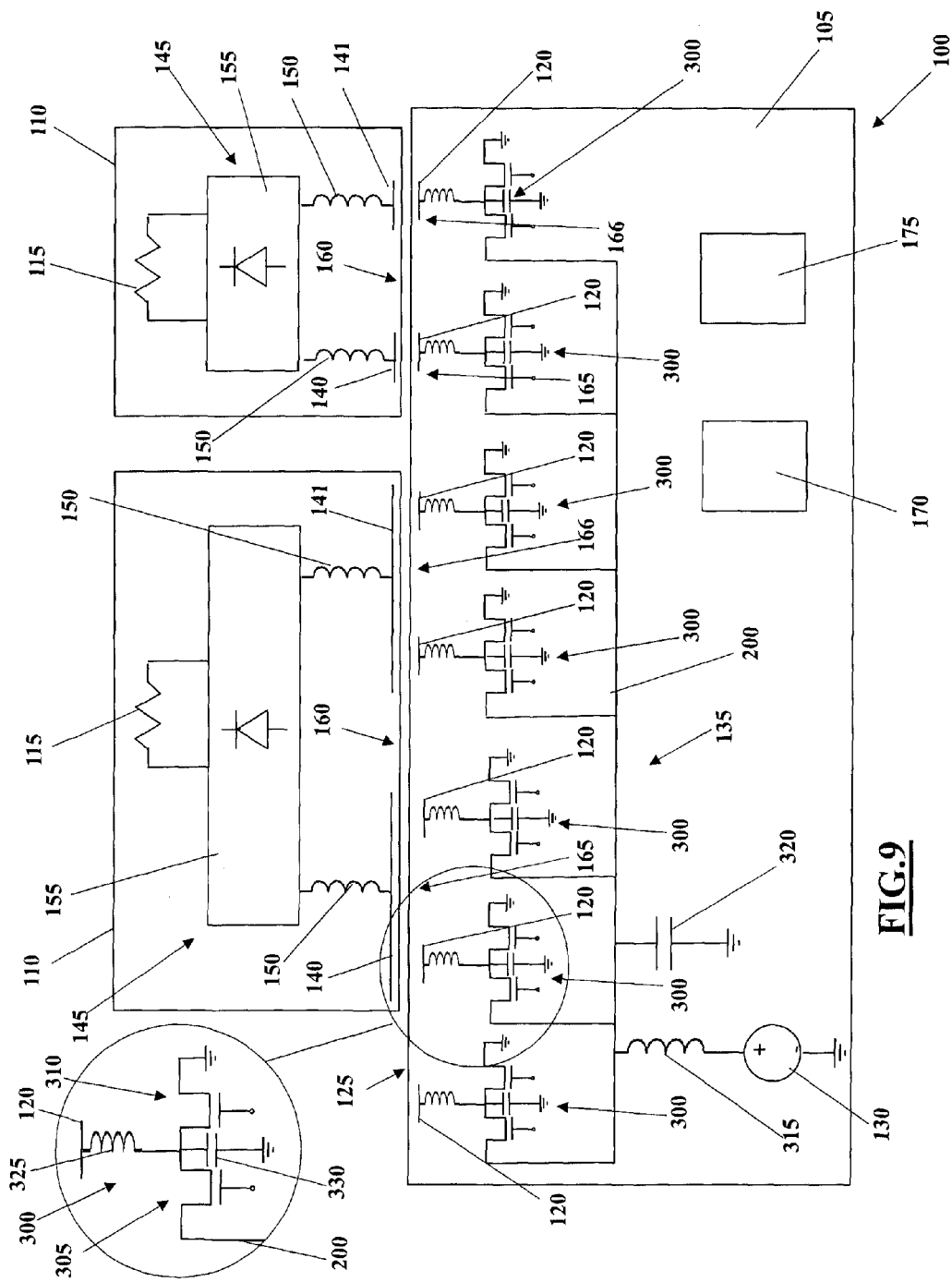
FIG. 9 is a variant of the circuit diagram of FIG. 7.

In a further variant of the third embodiment, shown in FIG. 9, each excitant module 300 can comprise an inductance 325 connected between the central node and the two switches in series 305 and 310 and the respective transmitting armature 120.

In this way, the inductance or inductances 150 that are in series with the receiving armatures 140 of the user device 110 can be partly or totally eliminated, for example so as to reduce the dimensions of the user device. Each excitant module 300 can also comprise an electrical capacitor 330 connected between the central node and the two switches in series 305 and 310 and the second terminal 205 of the primary circuit 135 (in the example earthed).

In this way, the tank 320 capacitor can also be partially or totally eliminated, without the transmission apparatus 100 being conceptually altered.

The assembly of the reactive electrical components (transmitting armatures, receiving armatures and inductors) of this third embodiment (in all its variants) can be tuned to resonate at a same or similar piloting frequency as at least one of the switches 305 or 310 of each excitant module 300. Further, by appropriately dimensioning these electrical components, the complete circuit of the transmission apparatus, constituted by the primary circuit 135 and the secondary circuit 145 coupled by the transmitting armatures 120 and the receiving armatures 140 and 141, can be likened to a resonant circuit, for example amplifiers of class E, F, E/F or the like.

In this way, the losses in the above-mentioned circuit can be very low, almost effectively zero, as the resonating circuits (for example in class E, F, E/F or the like) are tuned so as to eliminate or at least minimise all losses, thus with performance very much better than those of any inductive system.

Figure 10:
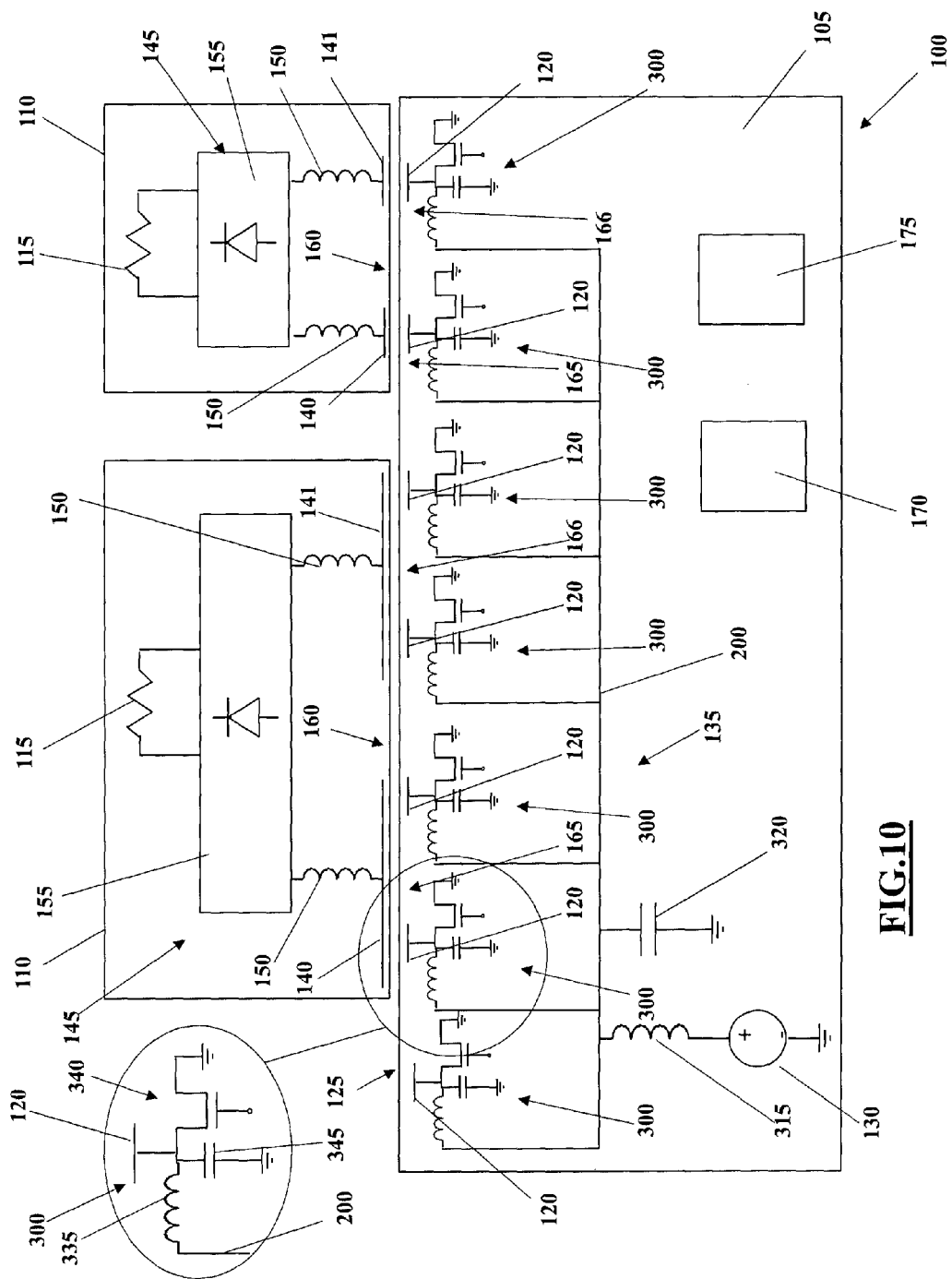
FIG. 10 is a circuit diagram of the apparatus of FIG. 1 in a fourth specific embodiment.

In a fourth embodiment of the invention, illustrated in FIG. 10, the primary electrical circuit 130 of the charging device 105 comprises, as in the preceding embodiment, a first electrical conductor 200 connected directly to the positive clamp of the tension generator 130 and a second electrical conductor 205 connected to the negative clamp of the tension generator 130, so that the tension generator 130 applies, between the first and the second electrical conductor 200 and 205, an electrical tension difference that is substantially constant, greater at the first conductor 200 and lesser at the second conductor 205.

In this example too, the second electrical conductor 205 is an earth, so that at least the negative clamp of the tension generator 130 is earthed. It is however possible that in other embodiments the second conductor 205 can have a different potential.

The primary circuit 135 again comprises a plurality of electrical excitant modules 300, in a number equal to the number of transmitting armatures 120. Each transmitting armature 120 is connected to one only of the excitant modules 300, which are reciprocally connected in parallel between the first and the second electrical conductor 200 and 205.

Each excitant module 300 comprises an electrical branch having an end node connected to the first conductor 200 and an opposite end node connected with the second conductor 205 (in this case earthed). The branch comprises, between the two end nodes, an inductance 335 and a switch 340 connected in series, where the inductance 335 is connected directly to the first conductor 200 (to which the greater tension is applied) while the switch 340 is directly connected to the second conductor 205 (in this case earthed). A central node is comprised between the inductance 335 and the switch 340, electrically connected to the respective transmitting armature 120.

The switch 340 of each excitant module 300 can be a bipolar transistor or an IGBT of pnp or npn type, or can be a MOSFET (n-MOS, p-MOS), a MEMS switch, a relay, a solid-state relay, or any other switch.

In this embodiment too, the secondary electrical circuit 145 of the user device 110 can comprise at least an electrical inductance 150 connected in series with each of the receiving armatures 140, 141.

In this embodiment also the primary electrical circuit 130 can comprise a choke inductance 315 connected in series between the tension generator 130 and the first electrical conductor 200, i.e. in series with the excitant modules 300, and possibly an electrical tank capacitor 320 connected between the first electrical conductor 200 and the second electrical conductor 205.

The tank capacitor 320 can however be partially or totally eliminated by exploiting for example the parasitic capacitance of the switches 340 of the excitant module 300.

The choke inductance 315 could also be partly or totally eliminated by means of an appropriate dimensioning of the inductances of each excitant module. The elimination of the choke inductance 315 could guarantee, for example, that the transmitting armatures 120 kept switched off are set at a continuous electrical tension, and therefore generate no electromagnetic pollution or losses and interact in no way with the surrounding environment.

In practice, this fourth embodiment is substantially similar to the third one, from which it differs only in that it replaces the high-tension switch 305 with the appropriate inductance 335.

With this solution, to charge the load 115 of each user device 110, the electronic command signal 175 of the apparatus 100 can be configured so as to pilot the switches 340 of the excitant modules 300 in the following way. For excitant modules 300 connected to the transmitting armatures 120 of the first sub-assembly i.e. those (at least one) which face the receiving armatures 140, the only switch 340 is piloted such as to switch on and off cyclically at high frequency.

For excitant modules 300 connected to the transmitting armatures 120 of the second sub-assembly i.e. those (at least one) which face the other receiving armature 141, the only switch 340 is piloted such as to switch on and off cyclically at high frequency, in synchrony but in opposite phase with respect to the switches 340 of the excitant modules 300 of the first sub-assembly (shifted by 180° in vector notation).

In this way the transmitting armatures 120 of the first sub-assembly will be excited with a periodic tension wave, while the transmitting armatures of the second sub-assembly will be excited with the same tension wave, but shifted by a quantity of half the period (180° in vector notation). The piloting enables always having the maximum potential difference between the transmitting armatures 120 of the first and the second sub-assembly, so that downstream of the receiving armatures 140 and 141 it is possible to collect energy useful for charging the load 115. Other piloting solutions are however possible, obtained by varying frequency, phase and form of the excitation signal of the switches 340, all valid should it be possible to collect energy useful for charging the load 115 downstream of the receiving armatures 140 and 141. At the same time, the change in the number of transmitting armatures 120, as well as the variation of the frequency, the phase and the shape of the excitation signal of the switches 340 can be appropriately exploited for controlling the tension and/or the current and/or the power transferred to the load 115.

As for the excitant modules 300 connected to the transmitting armatures 120 which are not facing any receiving armature 140 or 141 of any user device 110, the only switch 340 can be kept off statically (always off).

As illustrated in FIG. 10, each excitant module 300 can also comprise an electrical capacitor 345 connected between the central node of the electrical branch, between the inductance 335 and the switch 340, and the second terminal 205 of the primary circuit 135 (in the example earthed).

In this way, the tank 320 capacitor can also be partially or totally eliminated, without the transmission apparatus 100 being conceptually altered.

Figure 11:
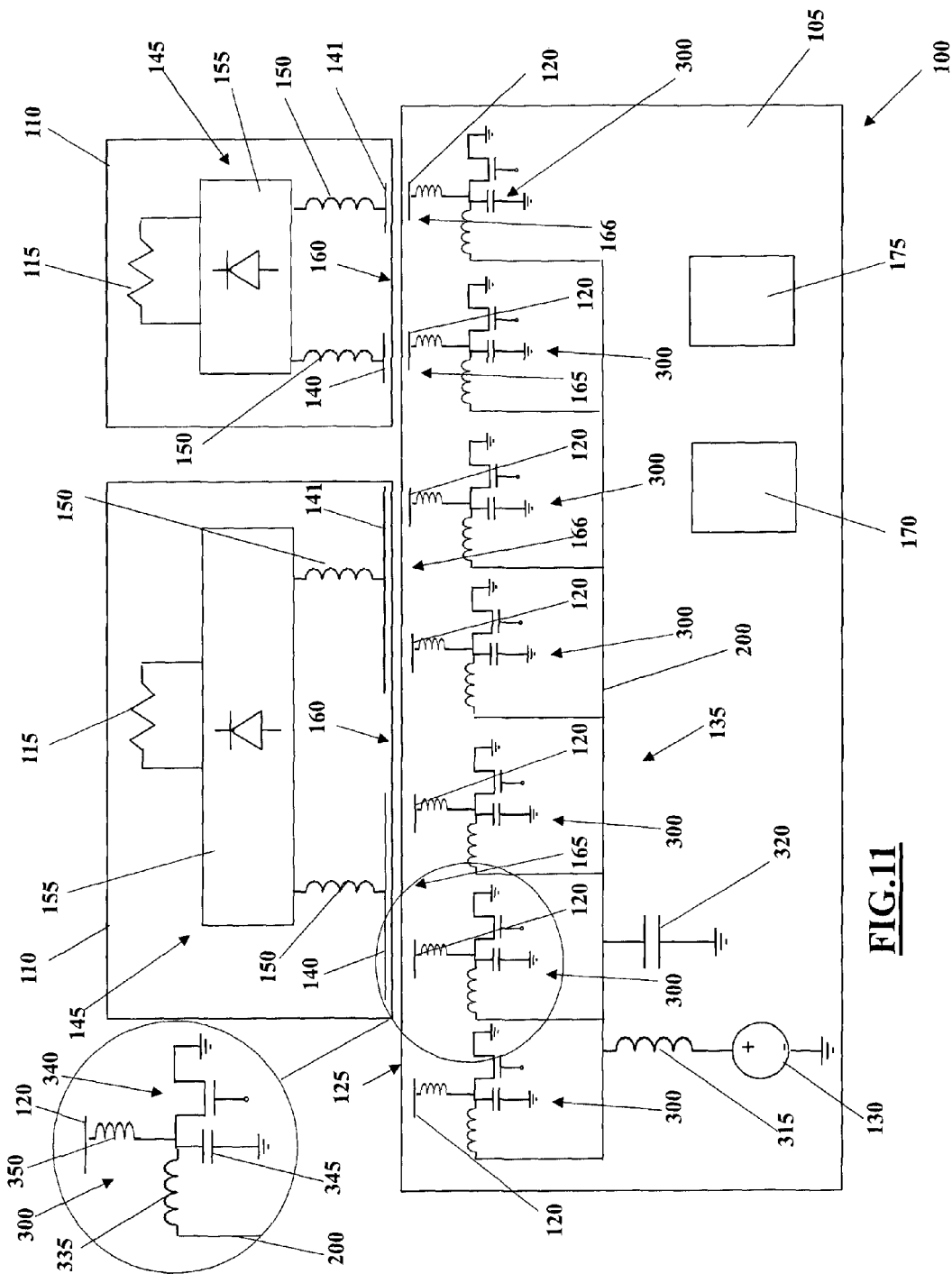
FIG. 11 is a variant of the circuit diagram of FIG. 10.

FIG. 11 illustrates a variant of the fourth embodiment which differs from what is described in the foregoing only in that each excitant module 300 also comprises an inductance 350 connected between the central node of the electrical branch, between the inductance 335 and the switch 340, and the relative transmitting armature 120.

In this way, the inductance or inductances 150 that are in series with the receiving armatures 140 and 141 of the user device 110 can be partly or totally eliminated, for example so as to reduce the dimensions of the user device 110.

As in the preceding case, the assembly of the reactive electrical components (transmitting armatures, receiving armatures and possibly inductors) of this fourth embodiment can be tuned to resonate at a same or similar piloting frequency as the switch 340 of each excitant module 300.

Further, by appropriately dimensioning these electrical components, the complete circuit, constituted by the primary circuit 130 and the secondary circuit 145 coupled by the transmitting armatures 120 and the receiving armatures 140 and 141, can be likened to a resonant circuit, for example amplifiers of class E, F, E/F or the like.

In an aspect common to all the above-delineated embodiments, the primary circuit 135 piloting the transmitting armatures 120 can be realised by a dedicated electronic card, which can be connected via cabling to the transmitting armatures.

Alternatively, the primary circuit can be realised partially or totally distributed, for example directly on the sub-layer on which the transmitting armatures 120 are applied, using for example one or more superposed conductive layer (multi-layer), each specially worked to realise appropriate conductive pathways, able to realise any one of the conceptual layouts described in the foregoing.

For example, a multilayer printed circuit can be realised with rigid or flexible, hard or soft dielectric sublayers, in which the transmitting armatures are realised on a first conductive layer and in which the electronic components are mounted and/or designed on the final conductive layer and are connected to the transmitting armatures by means of common vias.

In particular, the system can enable minimising or eliminating discrete inductances and capacitances, by realising them directly on the sheets constituting the transmission system.

An example of this type of solution is illustrated in FIGS. 12 and 13, in which the transmitting armatures 120 are applied on a dielectric layer 500 and are eventually isolated from the surrounding environment by a further dielectric layer located above the armatures themselves. A conductive layer 505 is applied below the dielectric layer 500, connected for example to earth, followed by a further dielectric layer 510 and lastly by a further conductive layer 515 connected to the tension generator 130. The passive electrical components of the primary circuit 135 (e.g. capacitances, inductors, resistors if present, etc.) can be mounted on the final conductive layer 515, as well as the tracks and the places of the active electrical components (e.g. transistors, switches), denoted in their entirety by 525, which are lastly connected to earth and to the transmitting armatures 120 by means of vias 520 passing between the various layers. Naturally, it is however possible to modify the number and arrangement of the layers according to needs, without altering they system.

In this way substantially small charging mats are obtained, having a slim thickness and possibly being cuttable into any shape without losing in terms of functionality, being very sturdy with respect to localised damage, and having a relatively low cost.

This mat can therefore be applied, at low cost and with an easily scalable technology, substantially for example to any pre-existing table surface, or to an article of furniture, wall, the inside of a motor car and many other places, transforming it into a wireless supply and recharging system.

In a further aspect of the invention there is a further possibility of realising, as well as the passive components (such as inductors, capacitances, any resistors), also the active electronic components (for example the MOSFETs, other transistors or switches) of the primary circuit directly on slim layers, for example by means of TFT technology (thin film transistor) which has been for some time exploited in the form of flat screens of OFETs (organic field-effect transistors).

TFT technology can be used for example to create slim layers in which all the necessary components for piloting of each transmission armature can be realised in a very high number directly on a single sublayer, for example polymeric.

These slim layers can therefore be applied directly to the multilayer element of FIG. 12, further improving the qualities mainly in terms of reduction of thickness, cost containing as well as simplicity of piloting.

In fact, thanks to TFT technology, the switches associated to the single transmitting armatures 120 of the matrix can be piloted by scansion of rows and columns, as happens with flat-screen, drastically reducing the complexity of the control card.

Alternatively it is possible to make each piloting system autonomous, by equipping it with an autonomous control system which enables the single transmitting armature 120 to enter a determined status (off, on, for piloting the first armature, on for piloting the second armature) without any need for any system or external control card, as a function of the measurement of the properties (electrical and otherwise) of the single armature, for example impedance, tension, current or particular signals transmitted between the armatures for determining a true and proper inter-armature communication protocol, aimed at informing the single independent armatures of the overall state of the system or a part thereof or the status in which the single armature is to be placed. This communication can occur by injection and reading pilot signals between the transmitting armatures through the receiving armatures, or the receiving armatures can signal their presence by means of a pilot signal read independently by the single transmitting armatures.

It is worthy of note that it is every economical to realise transmission sheets of wireless power of energy so-configured, with the possibility of reaching frequencies and therefore transmitted powers that are very high, so as to succeed in wireless charging of many user devices 110 at the same time, such as computers, keyboards, mice, tablets, telephones, mp3 readers, televisions, stereo sets, lighting systems and so on.

In a further aspect of the invention, common to all the above-described embodiments, to identify if a transmitting armature 120 of the charging device is facing the receiving armature 140, the receiving armature 141 or if it is not facing anything or a different object, the electronic monitoring and selection system can be configured so as to carry out a preliminary step of monitoring. In general terms, this step of monitoring can include supplying each transmitting armature 120 with a predetermined electrical test signal and to measure a parameter of the circuit (for example the impedance of a another physical and/or electrical property of the transmitting armature 120) of which the value is known previously in which the transmitting armature 120 is facing a receiving armature 140 or 141 or faces nothing.

Comparing the measured value with the known values of the monitored parameter, the monitoring and selection system is able to discern the specific condition of each single transmitting armature 120.

For example, the step of monitoring might include supplying each transmitting armature 120 with a predetermined piloting electric signal and measuring the tension on the transmitting armature 120 or the current in a branch of the circuit. During the step of monitoring the transmitting armature 120 can be supplied with a different tension with respect to the functioning tension during the charging of the load 120, for example for eliminating any source of electromagnetic pollution or for making the monitoring faster.

If the transmitting armature 120 faces a receiving armature 140 or 141, by virtue of the impedance of the receiving armature 140 and 141 and the specific tuning of the circuit (which are known parameters), the tension or current measured should have a predetermined characteristic wave form, very different from the wave form which would occur should the transmitting armature 120 not be facing anything, or if were facing another object. Consequently, in accordance with whether the measured wave form coincides or not with one of the above-mentioned characteristic wave forms, the monitoring phase is able to establish whether the transmitting arm 120 is facing a receiving armature 140 or 141, a different object or if it is not facing anything.

Should it be established that the transmitting armature 120 is facing a receiving armature, the monitoring step can distinguish whether it is armature 140 or armature 141, for example by means of measuring how the pilot signal applied to the transmitting armature 120 influences the nearby transmitting armatures 120, through the presence of the receiving armature 140 or 141.

This monitoring step can be carried out at the same time or in sequence on all the transmitting armatures 120 of the charging device with a single diagnostic procedure, which can be carried out continuously and periodically or when significant events occur.

Alternatively the monitoring step can be performed for each transmitting armature independently of the others, in continuous mode, periodical mode and/or when significant events occur.

As previously mentioned, the selection and command of the transmitting armatures 120 can be carried out by an electronic control system, able to read the salient amounts and to appropriately pilot all the switches of the primary circuit 135, or can be carried out by a plurality of electronic control systems (for example one for each group of armatures, or even one or more than one for each armature), in this way preventing the cabling and making each transmitting armature 120 autonomous, making the system robust and extremely versatile (for example able to be cut in any form and thus easily applicable to any surface).

In this last case, a communication system between the transmitting armatures 120, otherwise independent, possibly through the receiving armatures which react passively, useful for sharing data between the various control systems, or a communication system between receiving armatures can be included (which actively or passively signal the presence thereof) and transmitting armatures (which are informed of the proximity of the first or the second receiving armature). Irrespective of the protocol of communication, it is possible to exploit the signals injected into the transmitting armatures 120 for exchanging data between control systems, useful for example in understanding whether the nearby armatures are active, for synchronizing the armatures, correctly activating the single armatures, etc., or signals generated by an appropriate circuit on the device to be charged, connected to the receiving armatures can be exploited.

Obviously a technical expert in the field might make numerous modifications of a technical-applicational nature to the apparatus and the variants thereof, without forsaking the scope of the invention as claimed in the following.

The invention claimed is:

1. An apparatus (100) for transferring power to an electrical load (115), comprising:
    a charging device (105) comprising an assembly of at least three transmitting armatures (120), and a primary electrical circuit (135) able to connect each transmitting armature (120) to a tension generator (130), a user device (110), separate and independent from the charging device (105), which comprises the electrical load (115), at least a pair of receiving armatures (140, 141), and a secondary electrical circuit (145) able to connect the receiving armatures (140, 141) to the electrical load (115), the pair of receiving armatures being faceable to at least a pair of transmitting armatures (120) of the charging device (105) realizing there-with at least two distinct electrical capacitors (165, 166) that are configured to realize a wireless connection between the primary circuit (135) of the charging device (105) and the secondary circuit (145) of the user device (110), an electronic system (170) for monitoring and selecting, connected to the primary circuit (135) of the charging device (105), which electronic system (170) is configured so as to identify a first sub-assembly of transmitting armatures (120) which face an armature (140) of the receiving armatures of the user device (110), and so as to identify a second subassembly of transmitting armatures (120) which face the other receiving armature (141) of the user device (110), and an electronic command system (175) connected to the primary circuit (135) of the charging device (105), which is configured so as to command the primary circuit to apply, between the transmitting armatures (120) of the first and the second sub-assembly, a difference in electrical tension that is periodically variable over time.

2. The apparatus (100) of claim 1, wherein the secondary electrical circuit (145) comprises at least an electrical inductance (150) connected in series with the receiving armatures (140, 141).

3. The apparatus (100) of claim 1, wherein the secondary electrical circuit (145) comprises a tension rectifier (155) connected between the receiving armatures (140, 141) and the load (115).

4. The apparatus (100) of claim 1, wherein the primary electrical circuit (135) of the charging device (105) comprises:

a first and a second electrical conductor (200, 205), which are electrically connected to the tension generator (130) such as to be subjected to a constant electrical tension difference, and a plurality of electrical switches (210), each of which is able to electrically connect a respective transmitting armature (120) selectively with the first or the second electrical conductor (200, 205).

5. The apparatus (100) of claim 1, wherein the primary electrical circuit (135) of the charging device (105) comprises:

a first and a second electrical conductor (200, 205), which are electrically connected to the tension generator (130) via an inverter system (215) able to generate and apply to the first conductor (200) a time-variable tension while maintaining the second conductor (205) at a constant tension, and a plurality of electrical switches (210), each of which is able to electrically connect a respective transmitting armature (120) selectively with the first or the second electrical conductor (200, 205).

6. The apparatus (100) of claim 1, wherein the primary electrical circuit (135) of the charging device (105) comprises:

a first and a second electrical conductor (200, 205), which are electrically connected to the tension generator (130) in such a way as to be subjected to a constant difference of electrical tension, and a plurality of excitant electrical modules (300) connected in parallel between the first and second electrical conductor (200, 205) and singly connected to a respective transmitting armature (120), each of which comprises a pair of switches (305, 310) connected in series and between which a central node is comprised, electrically connected to the respective transmitting armature (120).

7. The apparatus (100) of claim 6, wherein the primary electrical circuit (135) of the charging device (105) comprises an inductance (315) connected in series between the tension generator (130) and the first electrical conductor (200).

8. The apparatus (100) of claim 7, wherein the primary circuit (135) of the charging device (105) comprises a capacitor (320) connected between the first electrical conductor (200) and the second electrical conductor (205).

9. The apparatus (100) of claim 6, wherein each excitant module (300) comprises an inductance (325, 350) connected between the central node and the respective armature (120).

10. The apparatus (100) of claim 6, wherein each excitant module (300) comprises an electrical capacitor (330, 345) connected between the central node and the second terminal (205) of the primary circuit (135).

11. The apparatus (100) of claim 1, wherein the primary electrical circuit (135) of the charging device (105) comprises:

a first and a second electrical conductor (200, 205), which are electrically connected to the tension generator (130) in such a way as to be subjected to a constant difference of electrical tension, and a plurality of excitant electrical modules (300) connected in parallel between the first and the second electrical conductor (200, 205) and singly connected to a respective transmitting armature (120), each of which comprises an inductance (335) and a switch (340) connected in series and between which a central node is comprised that is electrically connected to the respective transmitting armature (120).

12. The apparatus (100) of claim 11, wherein the primary electrical circuit (135) of the charging device (105) comprises an inductance (315) connected in series between the tension generator (130) and the first electrical conductor (200).

13. The apparatus (100) of claim 12, wherein the primary circuit (135) of the charging device (105) comprises a capacitor (320) connected between the first electrical conductor (200) and the second electrical conductor (205).

14. The apparatus (100) of claim 11, wherein each excitant module (300) comprises an inductance (325, 350) connected between the central node and the respective armature (120).

15. The apparatus (100) of claim 11, wherein each excitant module (300) comprises an electrical capacitor (330, 345) connected between the central node and the second terminal (205) of the primary circuit (135).

16. A method for transferring power to an electrical charge (115), comprising steps of:

predisposing a charging device (105) comprising an assembly of at least three transmitting armatures (120) and a primary electrical circuit (135) able to connect each transmitting armature (120) to a tension generator (130), predisposing a user device (110), separate and independent from the charging device (105), which comprises the electrical load (115), at least a pair of receiving armatures (140, 141), and a secondary electrical circuit (145) able to connect the receiving armatures (140, 141) to the electrical load (115), the pair of receiving armatures being faceable to at least a pair of transmitting armatures (120) of the charging device (105) realizing therewith at least two distinct electrical capacitors (165, 166) that are configured to realize a wireless connection between the primary circuit (135) of the charging device (105) and the secondary circuit (145) of the user device (110), identifying a first sub-assembly of transmitting armatures (120) which face an armature (140) of the receiving armatures of the user device (105), and so as to identify a second sub-assembly of transmitting armatures (120) which face the other receiving armature (141) of the user device (110), and commanding the primary circuit (135) to apply, between the transmitting armatures (120) of the first and the second sub-assembly, an electrical tension difference that is periodically variable over time.

* * * * *